United States Patent
Edson et al.

(10) Patent No.: US 11,897,906 B2
(45) Date of Patent: *Feb. 13, 2024

(54) MONOALKYL TIN COMPOUNDS WITH LOW POLYALKYL CONTAMINATION, THEIR COMPOSITIONS AND METHODS

(71) Applicant: Inpria Corporation, Corvallis, OR (US)

(72) Inventors: Joseph B. Edson, Corvallis, OR (US); Thomas J. Lamkin, Corvallis, OR (US); William Earley, Corvallis, OR (US); Truman Wambach, Portland, OR (US); Jeremy T. Anderson, Corvallis, OR (US)

(73) Assignee: Inpria Corporation, Corvallis, OR (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/198,669

(22) Filed: Mar. 11, 2021

(65) Prior Publication Data

US 2021/0198293 A1  Jul. 1, 2021

Related U.S. Application Data

(60) Continuation of application No. 16/936,861, filed on Jul. 23, 2020, now Pat. No. 10,975,109, which is a division of application No. 15/950,292, filed on Apr. 11, 2018, now Pat. No. 10,787,466.

(51) Int. Cl.
C07F 7/22 (2006.01)

(52) U.S. Cl.
CPC .......... *C07F 7/2284* (2013.01); *C07F 7/2224* (2013.01)

(58) Field of Classification Search
None
See application file for complete search history.

(56) References Cited

U.S. PATENT DOCUMENTS

| | | | |
|---|---|---|---|
| 2,675,399 A | 4/1954 | Ramsden et al. | |
| 2,822,409 A | 2/1958 | Gwynn et al. | |
| 3,398,169 A | 8/1968 | Neumann et al. | |
| 5,980,978 A | 11/1999 | Jones et al. | |
| 6,458,984 B1 | 10/2002 | Baum et al. | |
| 6,517,901 B1 | 2/2003 | Minami et al. | |
| 7,321,048 B2 | 1/2008 | Shenai-Katkhate et al. | |
| 7,842,828 B2 | 11/2010 | Bijanto et al. | |
| 8,198,352 B2 | 6/2012 | Deelman et al. | |
| 8,278,470 B2 | 10/2012 | Yanagihara et al. | |
| 8,633,330 B2 | 1/2014 | Merz et al. | |
| 9,310,684 B2 | 4/2016 | Meyers et al. | |
| 9,745,450 B2 | 8/2017 | Frenkel et al. | |
| 10,228,618 B2 * | 3/2019 | Meyers | G03F 7/167 |
| 10,787,466 B2 * | 9/2020 | Edson | C07F 7/2224 |
| 10,975,109 B2 * | 4/2021 | Edson | C07F 7/2284 |
| 11,673,903 B2 * | 6/2023 | Edson | C07F 7/2284 |
| | | | 252/182.13 |
| 2004/0211941 A1 | 10/2004 | Miyoshi | |
| 2007/0243337 A1 * | 10/2007 | Xiong | B82Y 30/00 |
| | | | 427/553 |
| 2008/0269405 A1 | 10/2008 | Okamoto et al. | |
| 2011/0166268 A1 * | 7/2011 | Deelman | C07F 7/2224 |
| | | | 252/400.1 |
| 2012/0223418 A1 | 9/2012 | Stowers et al. | |
| 2013/0281725 A1 | 10/2013 | Merz, III et al. | |
| 2014/0087066 A1 | 3/2014 | Wang et al. | |
| 2016/0116839 A1 * | 4/2016 | Meyers | G03F 7/325 |
| | | | 430/326 |
| 2017/0002180 A1 | 1/2017 | Frenkel et al. | |
| 2017/0102612 A1 * | 4/2017 | Meyers | G03F 7/0042 |
| 2017/0334935 A1 | 11/2017 | Pieper et al. | |
| 2019/0315781 A1 * | 10/2019 | Edson | C07F 7/2224 |
| 2019/0315782 A1 * | 10/2019 | Edson | C07F 7/2284 |

(Continued)

FOREIGN PATENT DOCUMENTS

| | | | | |
|---|---|---|---|---|
| DE | 3109309 A | * | 9/1982 | ....... G02F 1/133719 |
| DE | 3109309 A1 | | 9/1982 | |

(Continued)

OTHER PUBLICATIONS

D. Hanssgen et al., 293 Journal of Organometallic Chemistry, 191-195 (1985) (Year: 1985).*
Hänssgen et al., "Synthesis of the First Mono-t-butyltin Element Connections", Organometallic Chemistry, 293:191-195 (1985). (English Abstract Only).
Jaumier et al., "Transmetalation of Tetraalkynyltin Compounds With Grignard Reagents: Access to Mono-and Dialkyltin Products", Angewandte Chemie International Edition, 38(3):402-404 (Feb. 1, 1999).
Jaumier et al., "New Route To Monoorganotin Oxides and Alkoxides From Trialkynylorganotins", Chemical Communications, (3):369-370 (1998).
Jones et al., "Amino-Derivatives of Metals and Metalloids. Part I. Preparation of Aminostannenes, Stannylamines and Stannazanes", Journal of the Chemical Society, 1944-1951 (1965).

(Continued)

*Primary Examiner* — Alexander R Pagano
(74) *Attorney, Agent, or Firm* — Christensen, Fonder, Dardi PLLC; Diane E. Bennett; Peter S. Dardi

(57) ABSTRACT

A pure composition comprises a monoalkyltin trialkoxide compound represented by the chemical formula RSn(OR')$_3$ or a monoalkyl tin triamide compound represented by the chemical formula RSn(NR'$_2$)$_3$ and no more than 4 mole % dialkyltin compounds relative to the total tin amount, where R is a hydrocarbyl group with 1-31 carbon atoms, and wherein R' is a hydrocarbyl group with 1-10 carbon atoms. Methods are described for the formation of the pure compositions. A solid composition comprises a monoalkyl triamido tin compound represented by the chemical formula RSn—(NR'COR")$_3$, where R is a hydrocarbyl group with 1-31 carbon atoms, and where R' and R" are independently a hydrocarbyl group with 1-10 carbon atoms. The compositions are suitable for the formation of resist compositions suitable for EUV patterning in which the compositions have a high EUV absorption.

11 Claims, 13 Drawing Sheets

(56) References Cited

U.S. PATENT DOCUMENTS

| | | |
|---|---|---|
| 2020/0073238 A1 | 3/2020 | Zi et al. |
| 2020/0124970 A1 | 4/2020 | Kocsis et al. |
| 2020/0239498 A1 | 6/2020 | Clark et al. |
| 2020/0241413 A1 | 7/2020 | Clark et al. |
| 2021/0024552 A1* | 1/2021 | Edson .................. C07F 7/2224 |
| 2021/0198293 A1* | 7/2021 | Edson .................. C07F 7/2224 |

FOREIGN PATENT DOCUMENTS

| | | |
|---|---|---|
| EP | 2123659 A1 | 11/2009 |
| EP | 3435158 A1 | 1/2019 |
| KR | 10-2016-0132092 A | 11/2016 |
| KR | 10-2018-0054917 A | 5/2018 |
| WO | 2012-099253 A1 | 7/2012 |
| WO | 2017-163922 A1 | 9/2017 |
| WO | 2017-164018 A1 | 11/2018 |
| WO | 2019-023797 A1 | 2/2019 |

OTHER PUBLICATIONS

Pauli et al., "Importance of Purity Evaluation and the Potential of Quantitative 1H NMR as a Purity Assay" Journal of Medicinal Chemistry (2014) vol. 57, pp. 9220-9231.

Puff et al., "Zur Hydrolyse von Monoorganylzinn-trihalogeniden", Journal of Organometallic Chemistry, 368:173-183 (1989).

Weber et al., "Method development in quantitative NMR towards metrologically traceable organic certified reference materials used as 31P qNMR standards", Anal Bioanal Chem (2015), 407:3115-3126.

Williams et al., "Drying of Organic Solvents: Quantitative Evaluation of the Efficiency of Several Desiccants," J. Organic Chemistry 2010, 75 (24), 8351-8354.

International Search Report and Written Opinion for International Application No. PCT/US2019/0244708 dated Jul. 17, 2019 (14 pages).

* cited by examiner

MONOALKYL TIN COMPOUNDS WITH LOW POLYALKYL CONTAMINATION, THEIR COMPOSITIONS AND METHODS

CROSS REFERENCE TO RELATED APPLICATIONS

This continuation application claims priority to copending U.S. patent application Ser. No. 16/936,861 filed Jul. 23, 2020 to Edson et al., entitled "Monoalkyl Tin Compounds with Low Polyalkyl Contamination, Their Compositions And Methods," which claims priority to U.S. patent application Ser. No. 15/950,292, filed Apr. 11, 2018, now U.S. Pat. No. 10,787,466, to Edson et al., entitled "Monoalkyl Tin Compounds with Low Polyalkyl Contamination, Their Compositions And Methods," both of which are incorporated herein by reference.

FIELD OF THE INVENTION

The invention relates to high-purity compositions of monoalkyl tin triamides, monoalkyl tin trialkoxides, or monoalkyl triamido tin and the methods to make them.

BACKGROUND OF THE INVENTION

Organometallic compounds are of interest for providing metal ions in a solution processable form. Alkyl tin compounds provide a radiation sensitive Sn—C bond that can be used to pattern structures lithographically. The processing of semiconductor materials with ever shrinking dimensions results in demands for more versatile materials to achieve desired patterning resolution, and alkyl tin compounds are promising advanced materials to provide patterning advantages.

SUMMARY OF THE INVENTION

In a first aspect, the invention pertains to a composition comprising a monoalkyltin trialkoxide compound represented by the chemical formula $RSn(OR')_3$ or a monoalkyl tin triamide compound represented by the chemical formula $RSn(NR'_2)_3$ and no more than 4 mole % dialkyltin compounds relative to the total tin amount, where R is a hydrocarbyl group with 1-31 carbon atoms, and where R' is a hydrocarbyl group with 1-10 carbon atoms. The monoalkyl tin triamide can be reacted with an alcohol represented by the formula HOR" in an organic solvent to form $RSn(OR")_3$, wherein R" is independently a hydrocarbyl group with 1-10 carbon atoms to form a product composition, wherein the product composition has no more than 4 mole % dialkyltin compounds relative to the total amount of tin.

In a further aspect, the invention pertains to a composition comprising a monoalkyl triamido tin compound represented by the chemical formula $RSn-(NR'COR")_3$, where R is a hydrocarbyl group with 1-31 carbon atoms, and where R' and R" are independently a hydrocarbyl group with 1-10 carbon atoms.

In another aspect, the invention pertains to a method to form a monoalkyltin triamide compound, the method comprising, reacting an alkylating agent selected from the group consisting of RMgX, $R_2Zn$, $RZnNR'_2$, or a combination thereof, with $Sn(NR'_2)_4$ in a solution comprising an organic solvent, where R is a hydrocarbyl group with 1-31 carbon atoms, where X is a halogen, and where R' is a hydrocarbyl group with 1-10 carbon atoms.

In additional aspects, the invention pertains to a method for forming monoalkyl triamido tin, the method comprising reacting a monoalkyltin triamide compound represented by the chemical formula $RSn(NR'_2)_3$ with an amide (R"CONHR'") in an organic solvent, wherein R is a hydrocarbyl group with 1-31 carbon atoms, and wherein R', R" and R'" are independently a hydrocarbyl with 1-8 carbon atoms; and collecting a solid product represented by the formula $RSn(NR'" COR")_3$.

Moreover, the invention pertains to a method for forming a monoalkyl tin trialkoxide, the method comprising reacting a monoalkyl triamido tin compound ($RSn(NR'" COR")_3$) with an alkali alkoxide compound (QOR', where Q is an alkali metal atom) in an organic solvent to form a product compound represented by the chemical formula $RSn(OR')_3$, wherein R is a hydrocarbyl group with 1-31 carbon atoms and wherein R', R" and R'" are independently a hydrocarbyl group with 1-10 carbons.

DETAILED DESCRIPTION OF THE INVENTION

Figure 1:
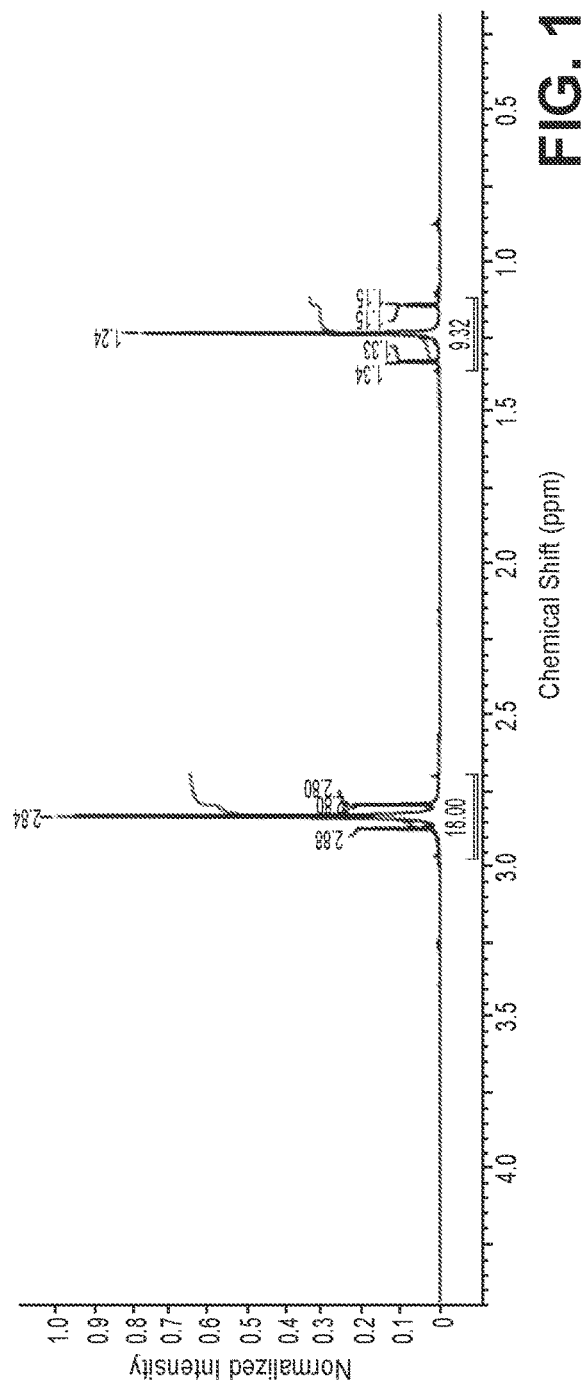
FIG. 1 is a $^1H$ NMR spectrum of t-BuSn(NMe$_2$)$_3$ synthesized with a Grignard reagent.

Methods have been found to obtain monoalkyl tin compositions, in particular monoalkyl tin triamides, monoalkyl tin trialkoxides, and monoalkyltrimido tin, with low polyalkyl tin byproducts. In particular, three approaches have been developed for the synthesis of monoalkyl tin triamides with relatively low polyalkyl tin byproducts that can be used as synthesized or further purified. The selectively synthesized monoalkyl tin triamides can then be used to synthesize monoalkyl tin trialkoxides with correspondingly low polyalkyl tin byproducts. Furthermore, monoalkyl tin triamides, whether or not pure, can be reacted in solution to form solid monoalkyl triamido tin that excludes the polyalkyl byproducts in the crystal such that the process is found to be effective to form the monoalkyl triamido tin with low polyalkyl byproducts. The synthesized monoalkyl tin amides and monoalkyl tin alkoxides can be further purified by fractional distillation to effectively reduce polyalkyl contaminants below levels that may already be relatively low from the direct synthesis. Analytical techniques can be used to evaluate the contaminant levels. In some embodiments, quantitative NMR (qNMR) shows byproducts can be reduced to concentrations below 1 mole percent. The product tin compositions can be useful as precursors for the synthesis of desirable patterning materials. For the application as precursors for patterning materials, the reduction of polyalkyl tin byproducts can be useful with respect to the properties of the monoalkyl tin product compositions for use as EUV and UV photoresists or electron-beam patterning resists.

Monoalkyl tin triamides can be useful intermediate products in the preparation of organotin photoresists. Methods for the preparation of monoalkyl tin triamides have previously employed lithium reagents to convert tin tetraamides to the desired triamides. For example, t-butyl tris(diethylamido)tin, (t-BuSn(NEt$_2$)$_3$), can be synthesized with a lithium reagent according to the method of Hänssgen, D.; Puff, H.; Beckerman, N. J. Organomet. Chem. 1985, 293, 191, incorporated herein by reference. These methods with lithium reagents, however, can produce a mixture of monoalkyl and dialkyl tin products. Also, lithium contaminants can be undesirable for semiconductor applications. Reported methods to prepare monoalkyl tin triamides containing a secondary alkyl group produce mixtures rich in mono-, di-, and triakyl tin products. As explained below, it can be desirable to reduce any polyalkyl byproducts, e.g., dialkyl tin contaminants. While the monoalkyl and dialkyl species can be separated from each other for some compounds, the separation or purification process generally raises the cost of manufacturing, and entrained dialkyl impurities may compromise the performance of downstream photoresist products. Thus, it can be desirable to synthesize the monoalkyl tin compounds with higher purity such that any subsequent purification, such as with fractional distillation, if desired, results in even lower dialkyl or polyalkyl contamination. If the as-synthesized compositions are sufficiently pure, a further purification by fractional distillation can be avoided.

The use of high purity monoalkyl tin compounds, especially mercapto compounds as polymer stabilizers, is described in U.S. Pat. No. 8,198,352 to Deelman et al., entitled "High Purity Monoalkyltin Compounds and Uses Thereof," and U.S. Pat. No. 9,745,450 to Frenkel et al., entitled "Stabilizers Containing High Purity Mono-Alkyltin Compounds," both of which are incorporated herein by reference. These patents describe the formation of pure monoalkyl halides as precursors for the synthesis of the stabilizer compounds. The processes described herein are focused on the synthesis of highly pure monoalkyl tin triamide, monoalkyl tin trialkoxide, or monoalkyl triamido tin compounds using distinct and effective synthesis approaches, which can be used in conjunction with fractional distillation for purification.

The use of alkyl metal coordination compounds in high performance radiation-based patterning compositions is described, for example, in U.S. Pat. No. 9,310,684 to Meyers et al., entitled "Organometallic Solution Based High Resolution Patterning Compositions," incorporated herein by reference. Refinements of these organometallic compositions for patterning are described in published U.S. patent applications 2016/0116839 A1 to Meyers et al., entitled "Organometallic Solution Based High Resolution Patterning Compositions and Corresponding Methods," and 2017/0102612 A1 to Meyers et al. (hereinafter the '612 application), entitled "Organotin Oxide Hydroxide Patterning Compositions, Precursors, and Patterning," both of which are incorporated herein by reference.

The radiation patterning performed with alkyl tin compositions generally is performed with alkyltin oxo-hydroxo moieties. The compositions synthesized herein can be effective precursors for forming the alkyl tin oxo-hydroxo compositions that are effective for high resolution patterning. The alkyltin precursor compositions comprise a group that can be hydrolyzed with water or other suitable reagent under appropriate conditions to form the alkyl tin oxo-hydroxo patterning compositions, which can be represented by the formula RSnO$_{(1.5-(x/2))}$(OH)$_x$ where 0<x≤3. The hydrolysis and condensation reactions that can transform the compositions with hydrolyzable groups (X) are indicated in the following reactions:

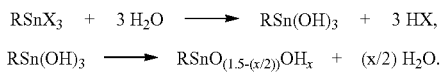

If the hydrolysis products HX are sufficiently volatile, in situ hydrolysis can be performed with water vapor during the substrate coating process, but the hydrolysis reactions can also be performed in solution to form the alkyl tin oxo-hydroxo compositions. These processing options are described further in the '612 application.

Polyalkyl tin impurity compositions may affect condensation and contribute to photoresist outgassing during lithographic processing, which increases the potential for tin contamination of equipment used for film deposition and patterning. Based on these concerns, a significant desire exists to reduce or eliminate the dialkyl or other polyalkyl components. Three classes of compositions are relevant for the processing described herein for the reduction of polyalkyl tin contaminants in ultimate resist compositions, specifically, monoalkyl tin triamide, monoalkyl tin trialkoxide, and monoalkyl triamido tin. As explained further in the following, the monoalkyl tin triamide compositions can also serve as precursors for the monoalkyl tin trialkoxide and monoalkyl triamido tin compositions. The monoalkyl triamido tin compositions can also be convenient precursors for forming the monoalkyl tin trialkoxide compositions. The monoalkyl tin trialkoxide compositions can be desirable constituents in precursor patterning composition solutions since they are amendable to in situ hydrolysis and condensation to form monoalkyl tin oxo-hydroxo compositions with alcohol byproducts that are generally appropriately volatile for removal commensurate with in situ hydrolysis.

The monoalkyl tin triamide compositions can be directly synthesized with relatively low polyalkyl contaminants using any one of three methods described herein. The methods with Zn reagents were specifically developed for synthesis of pure monoalkyl tin triamides containing secondary alkyl groups. Furthermore, at least some of the monoalkyl tin triamide compositions can be further purified using fractional distillation. The synthesis of monoalkyl triamido tin compositions from the monoalkyl tin triamide compositions provides a further approach to reduce the polyalkyl contaminants. These approaches can be combined to result in further reduction of polyalkyl contaminants.

The monoalkyl tin triamide compositions generally can be represented by the formula $RSn(NR')_3$, where R and R' are independently an alkyl or a cycloalkyl with 1-31 carbon atoms with one or more carbon atoms optionally substituted with one of more heteroatom functional groups containing O, N, Si, and/or halogen atoms or an alkyl or a cycloalkyl further functionalized with a phenyl or cyano group. In some embodiments, R' can comprise ≤10 carbon atoms and can be, for example, methyl, ethyl, propyl, isopropyl, butyl, t-butyl, isobutyl, or t-amyl. The R group can be a linear, branched, (i.e., secondary or tertiary at the metal-bonded carbon atom), or cyclic hydrocarbyl group. Each R group individually and generally has from 1 to 31 carbon atoms with 3 to 31 carbon atoms for the group with a secondary-bonded carbon atom and 4 to 31 carbon atoms for the group with a tertiary-bonded carbon atom. In particular, branched alkyl ligands can be desirable for some patterning compositions where the compound can be represented as $R^1R^2R^3CSn(NR')_3$, where $R^1$ and $R^2$ are independently an alkyl group with 1-10 carbon atoms, and $R^3$ is hydrogen or an alkyl group with 1-10 carbon atoms. As noted below, this representation of alkyl ligand R is similarly applicable to the other embodiments generally with $R^1R^2R^3CSn(X)_3$, with X corresponding to the trialkoxide or triamide moieties. In some embodiments $R^1$ and $R^2$ can form a cyclic alkyl moiety, and $R^3$ may also join the other groups in a cyclic moiety. Suitable branched alkyl ligands can be, for example, isopropyl ($R^1$ and $R^2$ are methyl and $R^3$ is hydrogen), tert-butyl ($R^1$, $R^2$ and $R^3$ are methyl), tert-amyl ($R^1$ and $R^2$ are methyl and $R^3$ is —$CH_2CH_3$), sec-butyl ($R^1$ is methyl, $R^2$ is —$CH_2CH_3$, and $R^3$ is hydrogen), neopentyl ($R^1$ and $R^2$ are hydrogen, and $R^3$ is —$C(CH_3)_3$), cyclohexyl, cyclopentyl, cyclobutyl, and cyclopropyl. Examples of suitable cyclic groups include, for example, 1-adamantyl (—$C(CH_2)_3(CH)_3(CH_2)_3$ or tricyclo(3.3.1.13,7) decane bonded to the metal at a tertiary carbon) and 2-adamantyl (—$CH(CH)_2(CH_2)_4(CH_2)(CH_2)$ or tricyclo(3.3.1.13,7) decane bonded to the metal at a secondary carbon). In other embodiments hydrocarbyl groups may include aryl or alkenyl groups, for example, benzyl or allyl, or alkynyl groups. In other embodiments the hydrocarbyl ligand R may include any group consisting solely of C and H and containing 1-31 carbon atoms. For example: linear or branched alkyl (i-Pr (($CH_3)_2$CH—), t-Bu (($CH_3)_3$C—), Me ($CH_3$—), n-Bu ($CH_3CH_2CH_2CH_2$—)), cyclo-alkyl (cyclo-propyl, cyclo-butyl, cyclo-pentyl), olefinic (alkenyl, aryl, allylic), or alkynyl groups, or combinations thereof. In further embodiments suitable R groups may include hydrocarbyl groups substituted with hetero-atom functional groups including cyano, thio, silyl, ether, keto, ester, or halogenated groups or combinations thereof.

The alkyl tin trialkoxide compositions can be represented by the formula $RSn(OR^O)_3$, and the alkyl triamido tin compositions can be represented by the formula $RSn(NR"COR"')_3$. The R groups in the formulas for the alkyl tin trialkoxide and alkyl triamido tin compositions can be the same R groups as summarized above for the alkyl tin triamide compositions, and the corresponding discussion of these R groups above is as if copied in this paragraph in its entirety. For the alkylamido (—NR"COR"') or alkoxide ligands —$OR^O$, the R", R"' and $R^O$ groups can be independently hydrocarbon groups with 1-10 carbon atoms, such as methyl groups, ethyl groups, or the like. R" and R"' can independently also be hydrogen.

In some embodiments, the compositions (monoalkyl tin triamides, monoalkyl tin trialkoxides or monoalkyl triamido tin) herein can have dialkyl tin contaminants in amounts of no more than about 4 mole percent with respect to tin, in further embodiments no more than about 3 mole percent, in some embodiments no more than about 2 mole percent, in additional embodiments no more than about 1 mole percent dialkyl tin contaminants, in other embodiments no more than about 0.5 mole percent dialkyl tin contaminants, and in another embodiment no more than about 0.1 mole percent. A person of ordinary skill in the art will recognize that additional ranges of dialkyl tin contaminants within the explicit ranges above are contemplated and are within the present disclosure. The level of dialkyl tin contaminants can generally be performed using any reasonable analytical technique. In some embodiments, the amount of dialkyl tin diamide or dialkyl tin dialkoxide can be shown to be near or below 0.1 mole percent by quantitative NMR. As a result of potential unidentified contaminants, the quantification of the monoalkyl tin compositions may be measured within a few percent, but the level of error in the relatively small quantities for the dialkyl tin contaminants provides reliability using the quantitative NMR as noted in the examples below.

The monoalkyl Sn precursors were analyzed without derivatization by $^1H$ and $^{119}Sn$ NMR spectroscopy. Integration values from NMR spectral peaks of a monoalkyl Sn precursor relative to an internal standard were used to determine purity. Precautions were taken to ensure that the values accurately reflected the purity of the monoalkyl Sn precursor. Calibrated 90-degree pulses were used to irradiate samples for $^1H$ NMR and inverse-gated $^{119}Sn\{^1H\}$ NMR experiments. Additionally, for both $^1H$ and $^{119}Sn\{^1H\}$ NMR experiments, the $T_1$ relaxation values of the standard and analyte were measured with an inversion recovery experiment. The measured $T_1$ values were used to set recycle delay times equal to 5 times the longest $T_1$ time of the sample, which allows for nearly complete relaxation of the nuclei ($Z=1-e^{(elapsed\ time/T1)}$) to equilibrium ($Z=1-e^{-5}=0.99326$). Finally, for $^{119}Sn\{^1H\}$ NMR experiments, to account for the diminished intensity of spectral peaks that are not located at the center of a spectral window, the B1 profile of the NMR spectrometer was measured and accounted for by centering the spectrum between the analyte and standard. Detection and quantification of trace Sn impurities were accomplished with a parameter set for inverse-gated $^{119}Sn\{^1H\}$ NMR spectroscopy that enhances the signal-to-noise ratio in the spectra: the center and sweep width of the spectra were set to a calibrated value, and a 30-degree pulse was used to irradiate the sample with the recycle delay time set to 1 second. Linear regression analysis was used to assign quantitative values to the low-level Sn impurities that were detected. The method provides a quantitation limit of 0.1% for dialkyl, tetrakis amide, and tetrakis alkoxide tin impurities relative to monoalkyl tin compounds. Quantitative NMR is described further in Weber et al., "Method development in quantitative NMR towards metrologically traceable organic certified reference materials used as $^{31}P$ qNMR standards," Anal. Bioanal. Chem., 407:3115-3123 (2015); and Pauli et al., "Importance of Purity Evaluation and the Potential of Quantitative $^1$H NMR as a Purity Assay," J. Medicinal Chemistry, 57, 9220-9231 (2014), both of which are incorporated herein by reference.

In general, the improved processes herein for preparing monoalkyl tin triamides comprise reacting a compound having an alkyl donating group, also described as an alkylating agent, with a tin tetraamide. Desirable results have been achieved in which the alkylating agent may be a Grignard reagent, a diorganozinc reagent, or a mono-organozinc amide. These syntheses can directly produce the monoalkyl tin triamides with low polyalkyl contaminants that can be used for forming resists or that can be further purified to reduce the contaminant levels even further. In the synthesis methods, the alkylating agent selectively replaces an amide group of tin tetraamide with the alkyl group. In some embodiments, the reaction selectively produces monoalkyl tin triamide with low polyalkyl tin contaminants, particularly low dialkyl tin contaminants. The synthesis methods described improve the selectivity and yield of monoalkyl tin triamides by limiting the formation of dialkyl tin byproducts. The methods are especially useful for branched alkyl systems. The monoalkyl tin triamides with low polyalkyl contaminants can then be used to form monoalkyl tin trialkoxides with low polyalkyl contaminants. As discussed further below, the formation of crystalline monoalkyl triamido tin compositions provides an alternative approach to avoid polyalkyl contaminants by their exclusion from the crystal.

For the reactions to form the monoalkyl tin triamide compounds, the tin tetraamide compounds can be obtained commercially or synthesized using known techniques. For example, tetrakis(dimethylamido)tin, $Sn(NMe_2)_4$, is available form Sigma-Aldrich. For the synthesis of the monoalkyl tin compositions, the tin tetraamide reactant in solution generally can have a concentration of between about 0.025 M and about 5 M, in further embodiments between about 0.05 M and about 4 M, or in additional embodiments between about 0.1 M and 2 M. A person of ordinary skill in the art will recognize that additional ranges of reactant concentrations within the explicit ranges above are contemplated and are within the present disclosure. In general, the relevant reactions to introduce an alkyl ligand to Sn can be initiated with the tin tetraamides in solution in a reactor under inert gas purge and in the dark. In alternative embodiments, some or all of the tin tetraamide reactant is added gradually, in which case the concentrations above may not be directly relevant since higher concentrations in the gradually added solution may be appropriate and the concentrations in the reactor may be transient.

The alkylating agent generally is added in an amount relatively close to a stoichiometric amount. In other words, the alkylating agent is added to provide the molar equivalent of one alkyl group for one tin atom. If an alkylating agent can provide multiple alkyl groups, such as the diorganozinc compounds that can donate two alkyl groups per zinc atom, then the stoichiometric amount of the alkylating agent is adjusted accordingly to provide about one alkyl group for each Sn. So, for diorganozinc compounds on the order of one mole of Zn is required per two moles of Sn. The amount of the alkylating agent can be about ±25%, about ±20%, or about ±15% relative to the stoichiometric amount of the reagent, or in other words the stoichiometric amount of the reagent + or – a selected amount to achieve desired process performance. A person of ordinary skill in the art will recognize that additional ranges of relative amount of alkylating agent within the explicit ranges above are contemplated and are within the present disclosure.

Examples 2 and 3 use approximately the stoichiometric amounts of alkylating agent, while Example 1 and Example 4 use about 110% (or 100%+10%) alkylating agent. The alkylating agent dissolved in organic solvent can be added gradually to the reactor, such as dropwise or flowed at a suitable rate to control the reaction. The rate of addition can be adjusted to control the reaction process, such as over the course of time between about 1 minute to about 2 hours and in further embodiments from about 10 minutes to about 90 minutes. The concentration of alkylating agent in the addition solution can be adjusted within reasonable values in view of the rate of addition. In principle, the alkylating reagent can start in the reactor with the gradual addition of the tin tetraamide. A person of ordinary skill in the art will recognize that additional ranges of alkylating agents and addition times within the explicit ranges above are contemplated and are within the scope of the present disclosure.

The reaction to introduce the alkyl ligand to the tin atom may be conducted in a low oxygen, substantially oxygen free, or an oxygen-free environment, and an active inert gas purge can provide the appropriate atmosphere, such as an anhydrous nitrogen purge or an argon purge. The following additives have been observed to reduce addition of a second alkyl group to tin: pyridine, 2,6-lutidine, 2,4-lutidine, 4-dimethylaminopyridine, 2-dimethylamino pyridine, triphenylphosphine, tributylphosphine, trimethylphosphine, 1,2-dimethoxyethane, 1,4-dioxane, and 1,3-dioxane. Other neutral coordinating bases may function in the same way. The reaction can optionally further comprise from about 0.25 to about 4 moles of neutral coordinating base per mole of tin. The reaction can be shielded from light during the reaction. The reaction may be conducted in an organic solvent, for example, an alkane (such as pentane or hexane), an aromatic hydrocarbon (such as toluene), ether (such as diethyl ether, $C_2H_5OC_2H_5$), or mixtures thereof. The solvent may be anhydrous to avoid reaction with water. The reaction generally is run for about 15 minutes to about 24 hours, in further embodiments from about 30 minutes to about 18 hours and in additional embodiments from about 45 minutes to about 15 hours. The temperature during the reaction may be between about $-100°$ C. and about $100°$ C., in further embodiments between about $-75°$ C. and about $75°$ C., and in additional embodiments between about $-60°$ C. and about $60°$ C. Cooling or heating can be used to control the reaction temperature within the desired range, and control of the rate of reactant addition can also be used to influence temperature evolution during the course of reaction. The product monoalkyl tin triamide generally is an oil that can be purified using vacuum distillation. Typical yields have been observed to be approximately 50 to 85 percent. A person of ordinary skill in the art will recognize that additional ranges of concentrations and process conditions within the explicit ranges above are contemplated and are within the present disclosure.

The alkylating agent may be a Grignard reagent, a diorganozinc reagent, or a mono-organozinc amide. A Grignard reagent can be an organo-magnesium halide. Specifically, a Grignard reagent in the described reaction may be RMgX, where X is a halide, generally Cl, Br, or I. R may be an alkyl or cycloalkyl and have between 1 and 31 carbon atoms, and generally R can be described more fully as above with respect to the R moiety of the product compositions, which is as if incorporated for this discussion in its entirety. For example, the alkyl or cycloalkyl may be branched, can comprise aromatic groups and/or may have one or more heteroatom functional groups containing atoms such as O, N, Si, and/or a halogen. Grignard reagents are available commercially or can be synthesized using known methods. Commercial sources include American Elements Company, Sigma-Aldrich, and many other suppliers.

In some embodiments, the alkylating agent is a diorganozinc reagent. The diorganozinc reagent can donate two alkyl groups to tin, so the amount of diorganozinc reagent is adjusted for the difference in molar equivalents. Specifically, the diorganozinc reagent may be $R_2Zn$. R may be an alkyl or cycloalkyl with between 1 and 31 carbon atoms. The R group can be specified more fully as above with respect to the R moiety of the product compositions, and the discussion above for the R group associated with the product monoalkyl tin compounds is considered part of the present discussion as if reproduced here. For example, the alkyl or cycloalkyl may be branched and may have one or more heteroatom functional groups containing atoms such as O, N, Si, and/or a halogen. Dicycloheptyl zinc $((C_7H_{13})_2Zn)$ reactant is exemplified below. Diorganozinc compounds are available commercially or can be synthesized using known techniques. Commercial sources include, for example, Alfa Aesar, Sigma-Aldrich, Rieke Metals (Nebraska, USA) and Triveni Chemicals (India). The reactant in the examples was synthesized.

In further embodiments the alkylating agent is a mono-organozinc amide ($RZnNR'_2$). R may be an alkyl or cycloalkyl generally having between 1 and 30 carbon atoms. The R group can be specified more fully as above with respect to the R moiety of the product compositions, and the discussion above for the R group associated with the product monoalkyl tin compounds is considered part of the present discussion as if reproduced here. For example, the alkyl or cycloalkyl may be branched and may have one or more carbon atoms substituted with one or more heteroatom functional groups containing atoms such as O, N, Si, and/or a halogen. In some embodiments, R' is an alkyl or cycloalkyl group, which can be substituted with a hetero-atom. In some embodiments, R' may have between 1 and 8 carbon atoms, in some embodiments between 1 and 5 carbon atoms, and in additional embodiments between 1 and 3 carbon atoms. R' may be methyl, ethyl, propyl, isopropyl, butyl, iso-butyl, t-butyl, or t-amyl groups. The mono-organozinc amides can be synthesized, for example, from an alkyl zinc halide (RZnX, X=I, Br, Cl) and lithium amide ($LiNR'_2$), which are commercially available reagents from Sigma-Aldrich.

The monoalkyl tin triamides produced using the methods described above or other methods not explicitly described herein can be further purified using fractional distillation. To reduce the temperature of the distillation process, the pressure can be reduced, for example, to a pressure from about 0.01 Torr to about 10 Torr, in further embodiments from about 0.05 Torr to about 5 Torr, and in further embodiments from about 0.1 Torr to about 2 Torr. A suitable fractional distillation column can be used with a volume suitable for the process, and these are commercially available. The temperature can be controlled in the vessel holding the material to be purified and along the column to achieve the desired separation. The thermal conditions for one embodiment is presented in Example 8 below, and these conditions can be readily generalized for other compositions based on the teachings herein. If the dialkyl tin triamide contaminants have a higher boiling point than the monoalkyl tin triamides, the monoalkyl tin triamides can be separated away during the distillation process. Fractions can be taken with volumes of liquid removed during stages of the fractional distillation, but Example 8 demonstrates good separation with reasonable yield free from detectable contaminants. If the dialkyl tin triamide contaminants have a lower boiling point than the monoalkyl tin triamides, the dialkyl tin triamides can be separated away by collecting and discarding an initial fraction during the distillation process.

Monoalkyl tin trialkoxides can be produced by reacting the corresponding monoalkyl tin triamide with an alcohol in a non-aqueous solvent and a base. The low polyalkyl tin contaminants in the monoalkyl tin triamides using the processing described herein can be carried forward into the product monoalkyl tin trialkoxides, so that the product monoalkyl tin trialkoxides have low dialkyl tin contaminants essentially at the mole percentages described above. Suitable organic solvents include, for example, an alkane (such as pentane or hexane), an aromatic hydrocarbon (such as toluene), ether (such as diethyl ether, $C_2H_5OC_2H_5$), or mixtures thereof. The alcohol is selected to provide the desired alkoxide group such that an alcohol ROH introduces the —OR group as the ligand attached to tin. A list of suitable R groups is provided above and correspondingly relate to the alcohol. Examples are provided below with t-amyl alcohol, but other alcohols can be similarly used to provide the desired —OR alkoxide ligand. The alcohol can be provided roughly in a stoichiometric amount. Since the alcohol is used to replace three amide groups, three mole equivalents of alcohol would be a stoichiometric amount. In general, the amount of alcohol can be at least about −5% stoichiometric equivalents and in further embodiments at least about a stoichiometric equivalent, and a large excess of alcohol can be used. Example 5 is performed with +3.33% over the stoichiometric equivalent of alcohol, i.e., 3.1 moles alcohol per mole of monoalkyl tin triamide. To facilitate purification of the product alkyl tin trialkoxide, a tetradentate chelating agent can be added to coordinate with unreacted species to form complexes that do not vaporize during distillation. For example, tri(2-aminoethyl)amine (TREN), triethylenetetraamine (trien), or other tertadentate non-planar coordination ligands can be used to complex with the unreacted species to facilitate purification. The coordination ligand can be added at a selected time from the start of the reaction to any time prior to performing the distillation, in an amount from about 0.5 mole % to about 15 mole % and in further embodiments from about 1.0 mole % to about 10 mole % relative to the tin molar quantity. A person of ordinary skill in the art will recognize that additional ranges of reactant amounts within the explicit ranges above are contemplated and are within the present disclosure. If desired, a fractional distillation can be performed to further purify the monoalkyl tin trialkoxides from polyalkyl contaminants.

While the monoalkyl tin triamide with low polyalkyl contaminants can be used effectively to form derivatives with correspondingly low polyalkyl contaminants, the synthesis of a monoalkyl triamido tin from the monoalkyl tin triamide can be used to form a low contaminant product even if the monoalkyl tin triamide does not have a low contaminant level, which is due to the formation of crystals of the monoalkyl triamido tin that evidently can exclude the polyalkyl contaminants. Thus, the synthesis of the monoalkyl triamido tin provides a supplemental or an alternative pathway to form compositions with low dialkyl tin contaminants. Therefore, in some embodiments, monoalkyl triamides with higher than desired contaminants, such as from commercial sources or reaction pathways with higher contaminant levels, can be used while still obtaining product compositions with low dialkyl tin contaminants. The monoalkyl triamido tin compounds can be used to form monoalkyl tin trialkoxide compositions with low dialkyl tin contaminants.

The reaction involves the addition of N-alkylamide, such as N-methylacetamide ($CH_3CONHCH_3$), to the monoalkyl tin triamide. In general, the N-alkylamide reactant can be written as $R^aCONHR^b$, where $R^a$ and $R^b$ are independently hydrocarbon groups with 1 to 10 carbon atoms, such as methyl groups, ethyl groups, propyl groups, isopropyl groups, or the like. The crystal structure of the product compound has been determined, and the structure is presented in the Examples below. In summary, the amide groups in the product are bound to the tin at the nitrogen atom to form the corresponding ligand structure.

To control heat production and progress of reaction, the N-alkylamide reactant can be added gradually, such as over at least about 2 minutes. The monoalkyl tin triamide can be dissolved in an organic solvent at a concentration from about 0.1M to about 8M and in further embodiments from about 0.2M to about 6M. Suitable organic solvents include, for example, an alkane (such as pentane or hexane), an aromatic hydrocarbon (such as toluene), ether (such as diethyl ether, $C_2H_5OC_2H_5$), or mixtures thereof. The reaction is exothermic, and heat generally does not need to be added. The reaction product can form crystals, and the reaction can be continued generally from about 20 minutes to 24 hours. After completion of the reaction, the solvent can be removed to collect the crystals of the product. The crystals can be washed and dried. The dialkyl tin compounds are observed to be excluded from the product crystal. A person of ordinary skill in the art will recognize that additional ranges of reactant concentrations, addition times, and reaction times within the explicit ranges above are contemplated and are within the present disclosure.

For the processing of radiation sensitive resist compositions, it can be desirable to react the monoalkyl triamido tin to form monoalkyl tin trialkoxide compounds. An alkali alkoxide can be used to replace the triamido ligands with alkoxide ligands through reaction in an organic slurry. As the monoalkyl tin trialkoxide compound forms, it dissolves in the organic solvent in a concentration from about 0.01M to 2M and in further embodiments from about 0.04M to about 1M. The alkali alkoxide compound can be written as ZOR', where Z is an alkali atom, such as K, Na, or Li, and —OR' is the alkoxide group that provides the corresponding R' group for the $RSn(OR')_3$ product composition. Some alkali alkoxides are available commercially, for example, from Sigma-Aldrich, and these compounds are highly hygroscopic, so they can be isolated from air. Suitable organic solvents include, for example, an alkane (such as pentane or hexane), an aromatic hydrocarbon (such as toluene), ether (such as diethyl ether, $C_2H_5OC_2H_5$), or mixtures thereof. The alkali alkoxide can be provided in at least a stoichiometric amount, which corresponds to three alkoxide groups per tin atom. The reaction can be carried out for from about 15 minutes to about 48 hrs. The product liquid can be distilled to purify the product. A person of ordinary skill in the art will realize that additional ranges of concentration and time within the explicit ranges above are contemplated and are within the scope of the present disclosure.

EXAMPLES

Example 1: Synthesis of t-BuSn(NMe$_2$)$_3$

This example is directed to the synthesis of the tin compound with a t-butyl group bonded to the tin replacing an N-methyl amide group.

Figure 2:
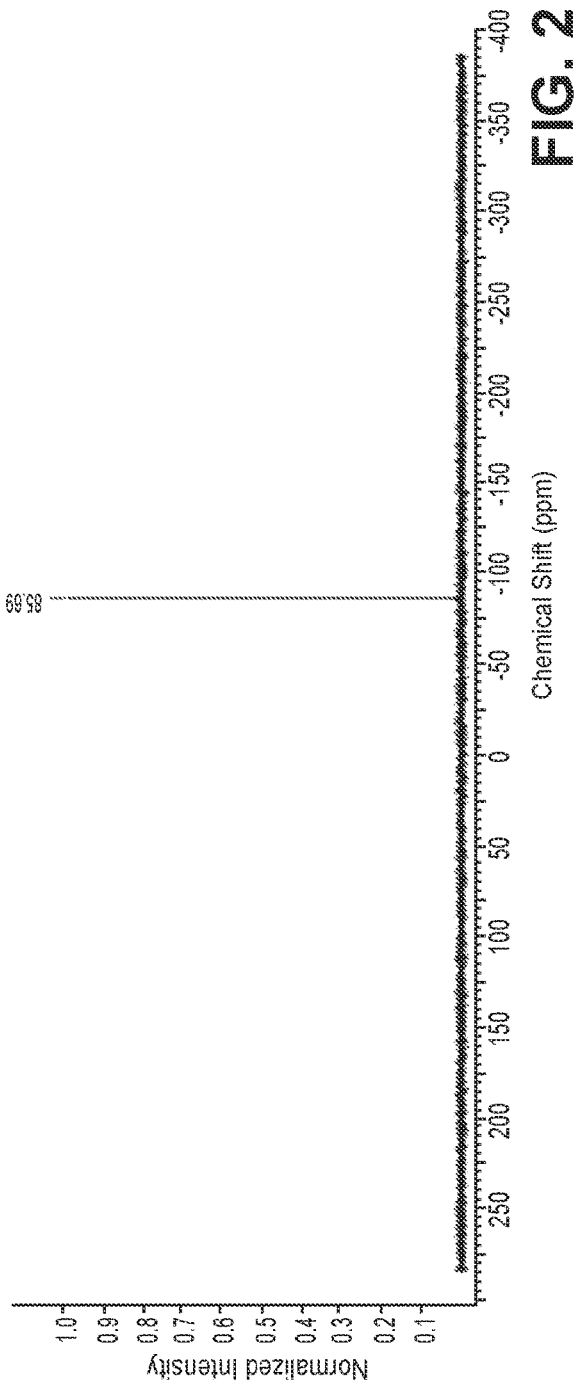
FIG. 2 is a $^{119}Sn$ NMR spectrum of t-BuSn(NMe$_2$)$_3$ correspondingly used to obtain the spectrum in FIG. 1.

A 5 L 3-neck round bottom flask was charged with $Sn(NMe_2)_4$ (827.5 g, 2805 mmol, Sigma) in an argon-filled glovebox. Anhydrous ether (2000 mL) was added to the flask. A quantity of t-BuMgCl (1500 mL, 2.06 M (freshly titrated), 3090 mmol) was added to a separate 2 L 2-neck round bottom flask. The flasks were stopped and attached to a Schlenk line. The $Sn(NMe_2)_4$ solution was transferred to a 5 L jacketed reactor and stirred at 240 RPM. An automated syringe pump was used to deliver the t-BuMgCl solution to the 5 L jacketed reactor at a rate of 50 ml min$^{-1}$. The temperature of the mixture in the jacketed reactor was maintained at 20° C. After complete addition of the t-BuMgCl solution, the reaction was stirred overnight. The resulting mixture was transferred through at 10 L filter reactor into a 5 L 3-neck round bottom flask equipped with a stir bar. The 5 L jacketed reactor and the solids in the filter reactor were rinsed with pentane (2×1 L). The washings were collected in the 5 L 3-neck round bottom flask equipped with a stir bar and the volatiles were removed under vacuum. After the volatiles were removed, a light yellow oily suspension corresponding to the crude product was observed. The flask was taken into a glovebox and the crude product was filtered through a course porosity fritted funnel. The filtrate was transferred into a 2 L 2-neck round bottom flask equipped with a stir bar, which was stoppered and transferred to a Schlenk line. The crude product was purified by short-path vacuum distillation into a 1 L receiving flask (500 mTorr, 65° C.-75° C.) to give 323-604 g, 37-70% of a colorless oil identified as t-BuSn(NMe$_2$)$_3$. Proton NMR (FIG. 1) and $^{119}$Sn NMR (FIG. 2) were performed to characterize the product with the following peaks observed: $^1$H NMR ($C_6D_6$, MHz): 2.84 (s, 18H, —NCH$_3$), 1.24 (s, 9H, H$_3$CC—); $^{119}$Sn NMR ($C_6D_6$, 186.4 MHz: −85.69. Quantitative proton NMR and tin NMR were performed to evaluate the purity of the product based on a standard. qNMR: $^1$H, standard 1,3,5-trimethoxybenzene, purity 94.5(3) mole % (94.5±0.3 mole %) monoalkyl tin; $^{119}$Sn, standard MeSnPh$_3$, purity 93.5(2) mole % monoalkyl tin.

| $^{119}$Sn qNMR on trace impurities: | | |
|---|---|---|
| Impurity | $I_{impurity}/I_{t-BuSn(NMe2)3}$ | % impurity/tBuSn(NMe$_2$)$_3$ (mol mol$^{-1}$) |
| tBu$_2$Sn(NMe$_2$)$_2$ | 2.2 × 10$^{-2}$ | 2.6(1) |
| Sn(NMe$_2$)$_4$ | 3 × 10$^{-3}$ | 0.1(1)* |

*value calculated from extrapolation from calibration curve.

Example 2: Synthesis of CySn(NMe$_2$)$_3$ (Cy=Cyclohexyl)

This example is directed to the synthesis of the tin compound with a cyclohexyl group from a Zn reagent replacing an N-methyl amide group of Sn(NMe$_2$)$_4$.

Figure 3:
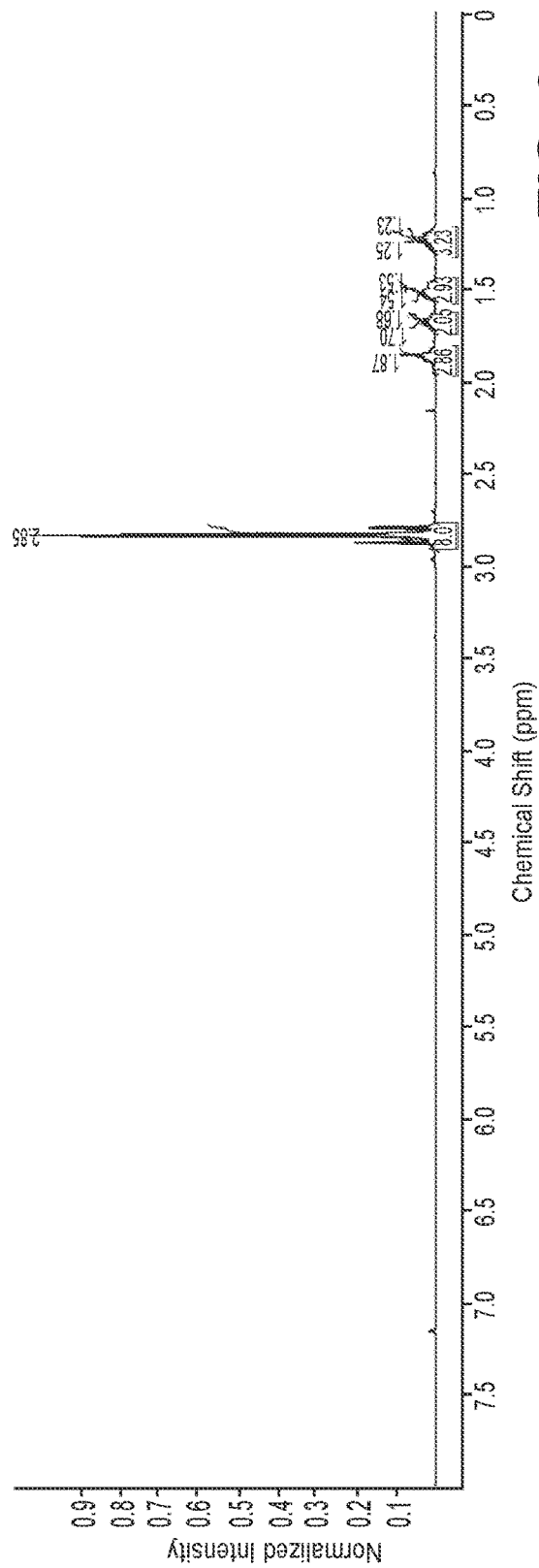
FIG. 3 is a $^1H$ NMR spectrum of CySn(NMe$_2$)$_3$ (Cy=cyclohexyl) synthesized with an alkyl zinc halide reagent.
Figure 4:
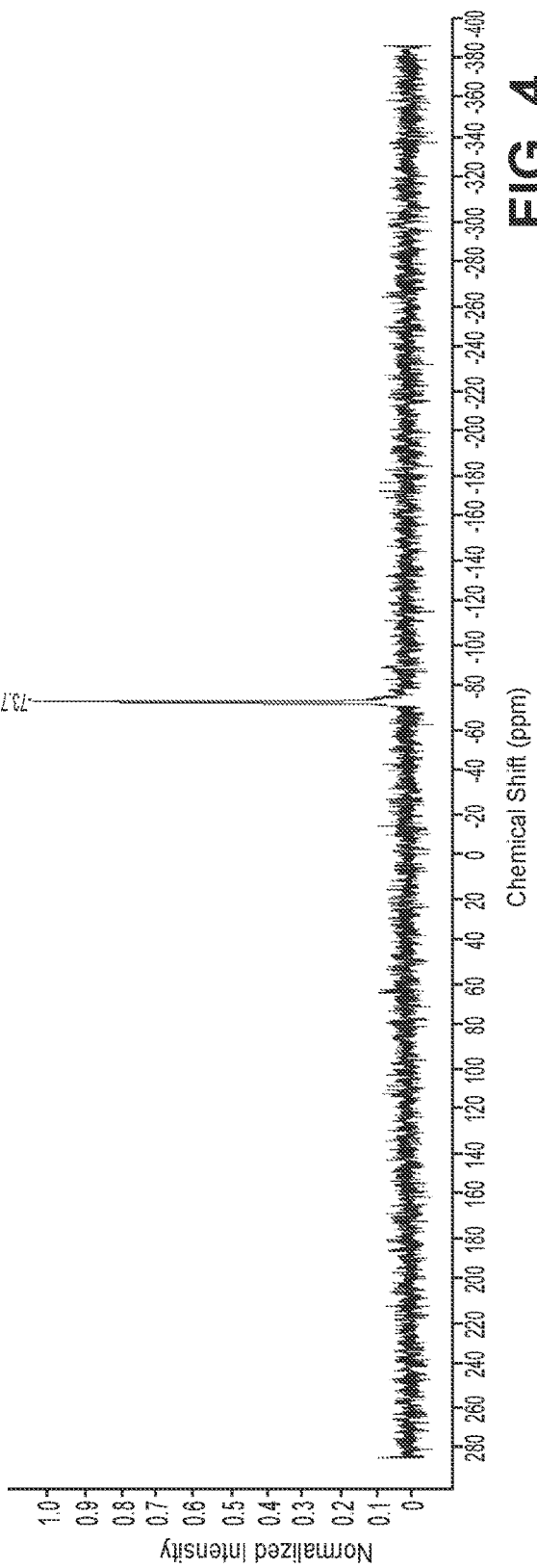
FIG. 4 is a $^{119}Sn$ NMR spectrum of CySn(NMe$_2$)$_3$ correspondingly used to obtain the spectrum in FIG. 3.

A 250 mL 3-neck round bottom flask (RBF) was charged with Sn(NMe$_2$)$_4$ (5.61 g, 19.0 mmol, Sigma) in an argon-filled glovebox. Anhydrous ether (150 mL) was added to the flask. Separately, a 100 mL RBF was charged w/LiNMe$_2$ (0.97 g, 19.0 mmol, Sigma) and anhydrous ether (20 mL). CyZnBr (Cy=cyclohexyl, 48.5 mL, 0.392M, 19.0 mmol, Sigma]) was added slowly to this flask to produce CyZnNMe$_2$. The CyZnBr was added slowly to control the reaction temperature because the reaction is exothermic. A dropping funnel and reflux condenser were attached under an active argon purge to the 3-neck 250 mL RBF on the Schlenk line. The CyZnNMe₂ solution was added to the dropping funnel and dispensed dropwise with stirring while the 250 mL RBF was covered with aluminum foil to keep out light. After complete addition, the reaction was stirred overnight and the solvent removed in vacuo to give a pale orange oil with a precipitate. The oil was purified by vacuum distillation (58-62° C., 150 mtorr). The resulting product was 4.38 g (69% yield) of a colorless oil identified as CySn(NMe₂)₃. Proton NMR (FIG. 3) and $^{119}$Sn NMR (FIG. 4) characterize the product with the following peaks observed: $^1$H NMR (C₆D₆, 500 MHz): 2.85 (s, 18H, —NCH₃), 1.86 (m, 3H, —CyH), 1.69 (m, 2H, —CyH), 1.53 (m, 3H, —CyH), 1.24 (m, 3H, —CyH); $^{119}$Sn NMR (C₆D₆, 186.4 MHz): −73.77.

Example 3. Synthesis of (CyHp)Sn(NMe₂)₃ (CyHp=Cycloheptyl)

This example is directed to the synthesis of a tin triamide with a cycloheptyl group, as shown in the following formula. In this synthesis, a cycloheptyl group from the zinc reagent (CyHp)₂Zn replaces an N-methyl amide group of Sn(NMe₂)₄.

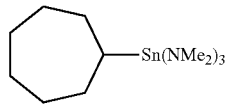

Figure 5:
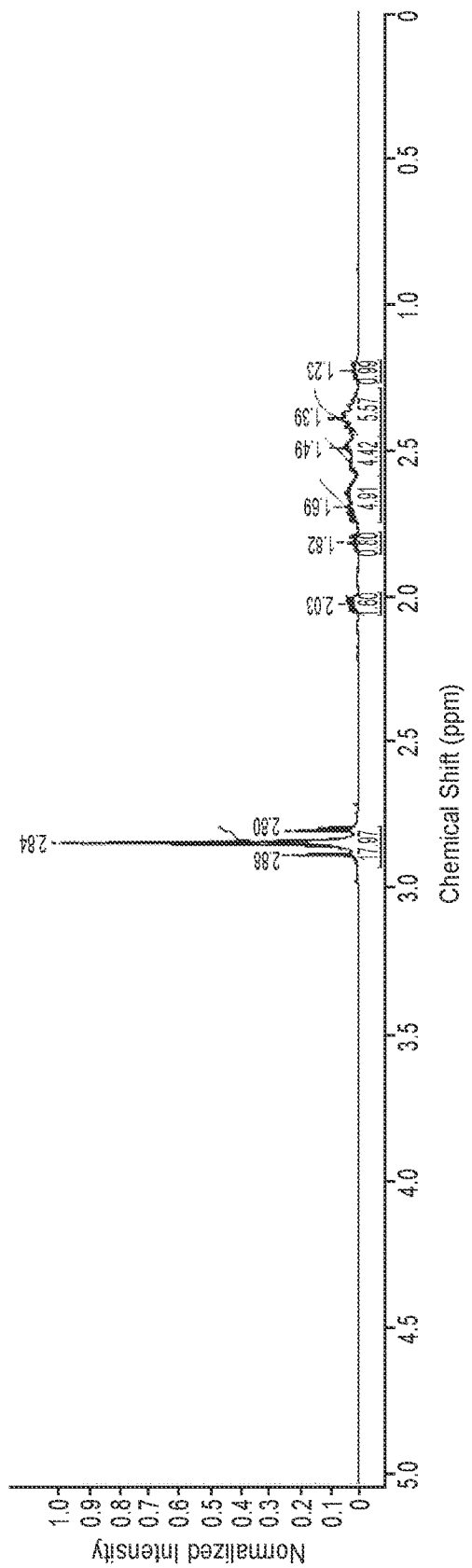
FIG. 5 is a $^1H$ NMR spectrum of CyHpSn(NMe$_2$)$_3$ synthesized with an dialkyl zinc reagent.
Figure 6:
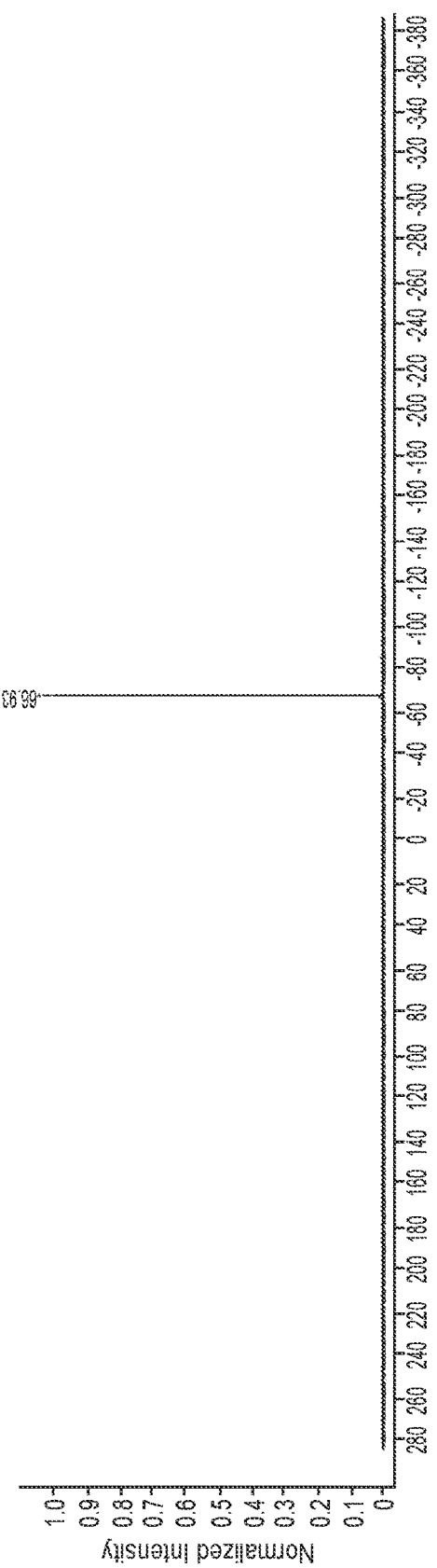
FIG. 6 is a $^{119}Sn$ NMR spectrum of CyHpSn(NMe$_2$)$_3$ correspondingly used to obtain the spectrum in FIG. 5.

A 250 mL 3-neck round bottom flask (RBF) was charged with Sn(NMe₂)₄ (6.49 g, 22.0 mmol, Sigma) in an argon-filled glovebox. Anhydrous ether (150 mL) was added. A dropping funnel and reflux condenser were attached under an active argon purge to the 3-neck 250 mL RBF on a Schlenk line. Separately prepared (CyHp)₂Zn (0.351M, 31.3 mL, 11.0 mmol) was synthesized as follows: 2 CyHpMgBr+ Zn(OCH₃)₂. The (CyHp)₂Zn solution was added to the dropping funnel under active argon purge and then dispensed dropwise with stirring while the 250-mL RBF was covered with aluminum foil to keep out light. After complete addition, the reaction was stirred overnight. The solvent was then removed in vacuo. The reaction flask was taken into a glovebox and hexane was added. The solution was filtered over Celite® and the solvent removed in vacuo to give a colorless oil with precipitate. The oil was purified by vacuum distillation (82-86° C., 180 mtorr). The resulting product was 4.01 g (52% yield) of a colorless oil identified as (CyHp)Sn(NMe₂)₃. Proton NMR (FIG. 5) and $^{119}$Sn NMR (FIG. 6) were performed to characterize the product with the following peaks observed: $^1$H NMR (C₆D₆, 500 MHz): 2.84 (s, 18H, —NCH₃), 2.01 (m, 2H, —CyHpH), 1.82 (m, 1H, —CyHpH), 1.69-1.23 (m, 10H, —CyHpH); $^{119}$Sn NMR (C₆D₆, 186.4 MHz): −66.93.

Example 4. Preparation of t-BuSn(NMe₂)₃ with Added Base

This example demonstrates the synthesis of the tin composition via reaction of a Grignard reagent with Sn(NMe₂)₄ in the presence of a base.

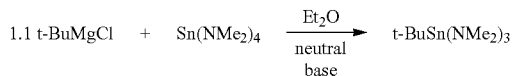

A 5-L, 3-neck RBF was charged with Sn(NMe₂)₄ (539.0 g, 1.827 mols, Sigma) in an argon-filled glovebox. Approximately 3 L of anhydrous diethyl ether and pyridine (289.1 g, 3.66 mols) were added to the flask. The flask was stoppered with glass stoppers on two of the necks and a vacuum adapter was attached to the third. Separately, a 2-L, 2-neck RBF was charged with 1 L of t-BuMgCl (Grignard reagent) as measured with a volumetric flask (2.01M (titrated), 2.01 mols, Sigma). On an argon-filled Schlenk line, a 5-L jacketed Chemglass™ reactor was prepped for a high vacuum and heat reaction. The reactor was backfilled with argon, and the jacket around the reactor vessel was then cooled to −30° C.

The contents of the 5-L, 3-neck RBF were transferred to the Chemglass™ reactor through polyethylene (PE) tubing under positive argon pressure. Stirring was commenced with an overhead stirrer, and the temperature of the reaction was allowed to cool to −15° C. On the Schlenk line, the Grignard reagent was added through polyethylene (PE) tubing with positive argon pressure over the course of 20-30 minutes, while the internal reaction temperature was maintained below 5° C. A dark orange color and precipitate developed. After complete addition, the reaction was stirred overnight and allowed to come to room temperature while keeping the reaction shielded from light with aluminum foil.

Figure 7:
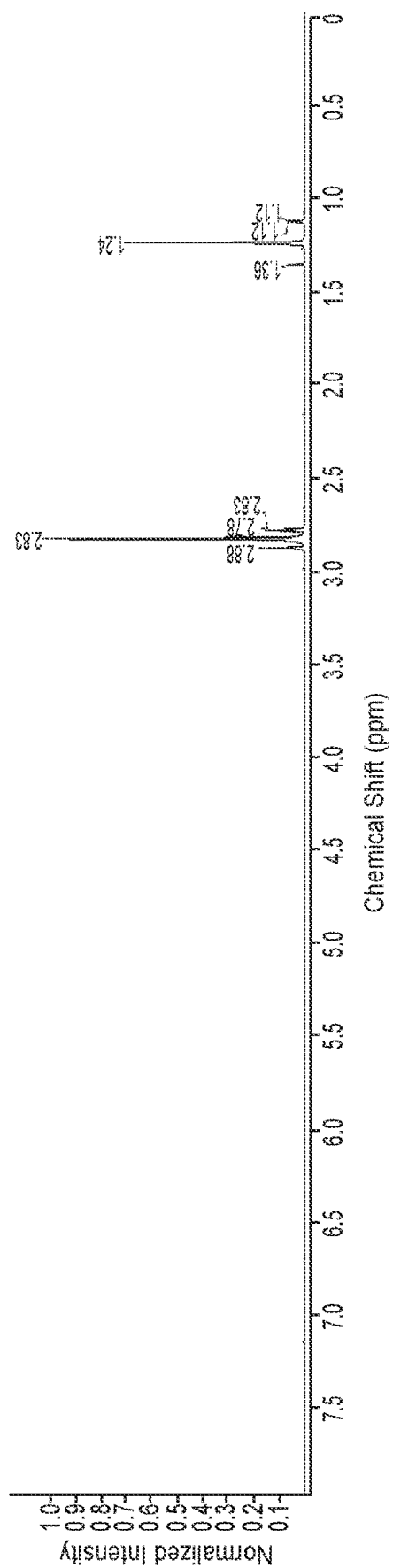
FIG. 7 is a $^1H$ NMR spectrum of t-BuSn(NMe$_2$)$_3$ synthesized with a Grignard reagent and a neutral base.
Figure 8:
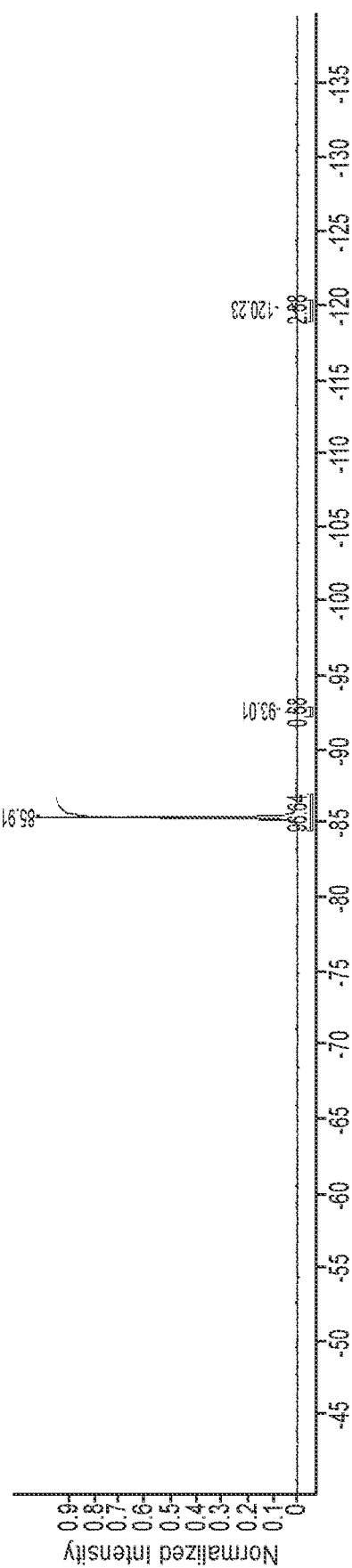
FIG. 8 is a $^{119}Sn$ NMR spectrum of t-BuSn(NMe$_2$)$_3$ correspondingly used to obtain the spectrum in FIG. 7.

After overnight reaction, the reaction color was light yellow. The solvent was removed in vacuo with the aid of a heating jacket at 30-35° C. After removal of the solvent, anhydrous pentane (~2.5 L) was added to the reactor via polyethylene tubing under positive argon pressure and the solids mixed thoroughly with the overhead stirrer. The reaction products dispersed in the pentane were transferred via polyethylene tubing to a 10-L filter reactor with positive argon pressure. The reaction products were filtered and then transferred through polyethylene tubing into a 3-L RBF. The pentane solvent was removed in vacuo from the resultant light-yellow filtrate to leave a yellow oil. The oil was transferred to a 1-L Schlenk flask and vacuum distilled with a short path distillation head (50-52° C., 300 mtorr), yielding 349.9 g (62%) of a colorless oil. FIG. 7 ($^1$H NMR) and 8 ($^{119}$Sn NMR) are analogous to FIGS. 1 and 2 and show the product consists of monoalkyl species in equilibrium with Sn(NMe₂)₄. Quantitative proton NMR and tin NMR were performed with a selected standard to evaluate the purity of the product. qNMR: $^1$H, standard 1,3,5-trimethoxybenzene, purity 89.9(7) mole % monoalkyl tin; $^{119}$Sn, standard MeSnPh₃, purity 93.6(4) mole % monoalkyl tin.

| $^{119}$Sn qNMR on trace impurities: | | |
|---|---|---|
| Impurity | $I_{impurity}/I_{t-BuSn(NMe2)3}$ | % impurity/tBuSn(NMe₂)₃ (mol mol⁻¹) |
| tBu₂Sn(NMe₂)₂ | 2 × 10⁻³ | 0.1(1)* |
| Sn(NMe₂)₄ | 2.4 × 10⁻² | 2.3(1) |

*value calculated from extrapolation of calibration curve

Example 5. Preparation of High-Purity Monoalkyl Alkoxide t-BuSn(OtAm)₃ from t-BuSn(NMe₂)₃

This example demonstrates the synthesis of monoalkyl tin trialkoxide from the corresponding monoalkyl tin triamide according to the following reaction.

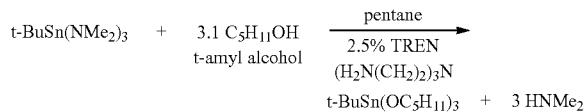

Figure 9:
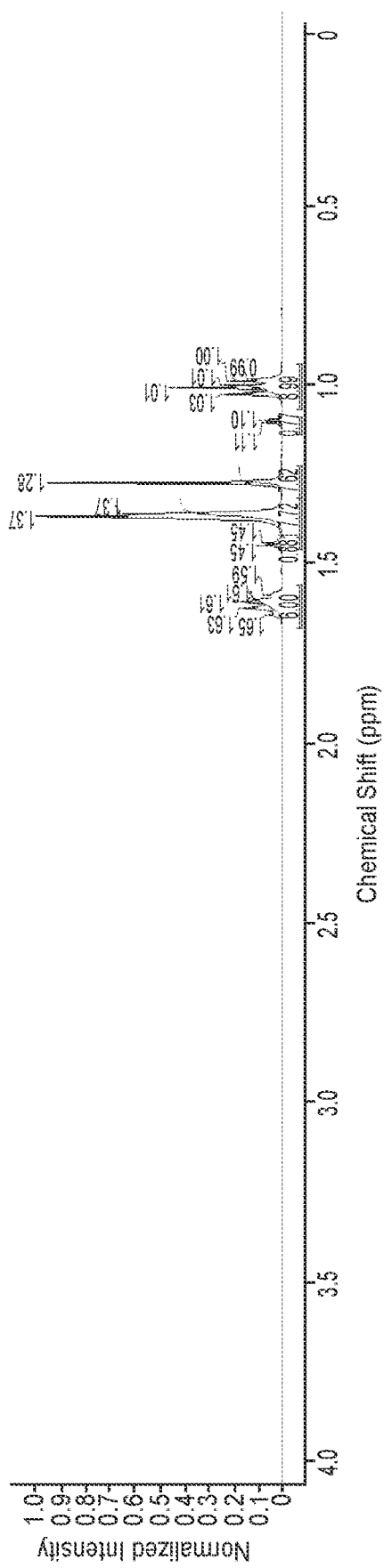
FIG. 9 is a $^1H$ NMR spectrum of t-BuSn(Ot-Am)$_3$ synthesized from t-BuSn(NMe$_2$)$_3$.
Figure 10:
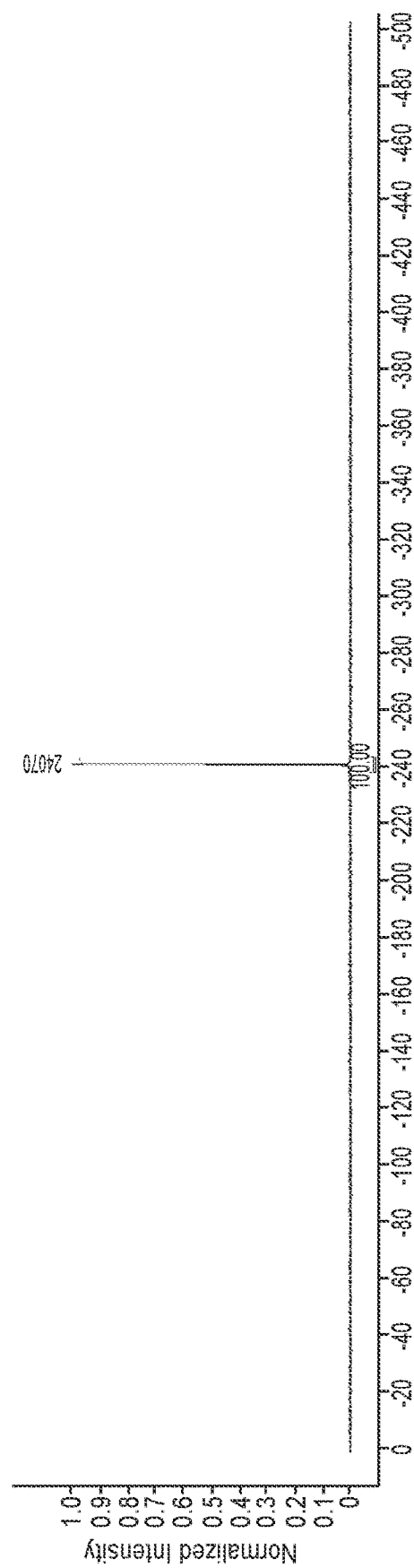
FIG. 10 is a $^{119}Sn$ NMR spectrum of t-BuSn(Ot-Am)$_3$ correspondingly used to obtain the spectrum in FIG. 9.

In a glovebox, a 2-L, 2-neck RBF was charged with 500-mL pentane and t-BuSn(NMe$_2$)$_3$ (329.4 g, 1.07 mol) from Example 4. The flask was tared on a balance, and tris(2-aminoethyl)amine (3.91 g, 26.7 mmol) was added via syringe directly into the reaction mixture. The amine complexes and removes tin tetrakisamide during reaction and purification. If it is not necessary to remove tin tetrakisamide from the system, the product of Example 1 may be used to synthesize additional monoalkyl tin products. the reaction sequence may be continued with the material synthesized according to Example 1. A magnetic stir bar was added, and the reaction was then sealed and brought to a Schlenk line. The flask was cooled in a dry ice/isopropanol bath. Separately, a 1-L Schlenk flask was charged with 2-methyl-2-butanol (292.2 g, 3.315 mols) and a small amount of pentane and then attached to the Schlenk line. The alcohol/pentane solution in the Schlenk flask was transferred via cannula to the reaction flask with an outlet purge to a mineral oil bubbler connected in line to an acid trap solution for the off-gassed NMe$_2$H. After complete addition of the alcohol, the reaction was allowed to come to room temperature and stirred for 1 hour. After 1 hour of reaction, the solvent was removed in vacuo, and the product was vacuum distilled (95-97° C., 500 mtorr) to yield 435 g (93%) of a colorless oil. FIG. 9 ($^1$H NMR) and 10 ($^{119}$Sn NMR) show NMR spectra for the final product t-BuSn(Ot-Am)$_3$ with the following peaks observed: $^1$H NMR (C$_6$D$_6$, 500 MHz): 1.61 (m, 6H, —OC(CH$_3$)$_2$CH$_2$), 1.37 (m, 18H, —OC(CH$_3$)$_2$), 1.28 (s, 9H, —C(CH$_3$)$_3$), 1.01 (m, 9H, —OC(CH$_3$)$_2$CH$_2$CH$^3$); $^{119}$Sn NMR (C$_6$D$_6$, 186.4 MHz): −240.70. Quantitative proton NMR was performed to evaluate the purity level of the product. qNMR: $^1$H, standard 1,3,5-trimethoxybenzene, purity 97.7(3)%; $^{119}$Sn, standard MeSnPh$_3$, 99(1) mole % monoalkyl tin.

Example 6. Preparation of t-butyltris(N-methylacetamido)tin(IV)

This example demonstrates the synthesis of monoalkyl triamido tin compositions by the reaction of t-BuSn(NMe$_2$)$_3$ with N-methylacetamide.

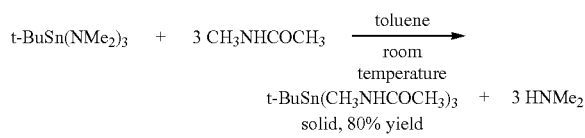

Figure 11:
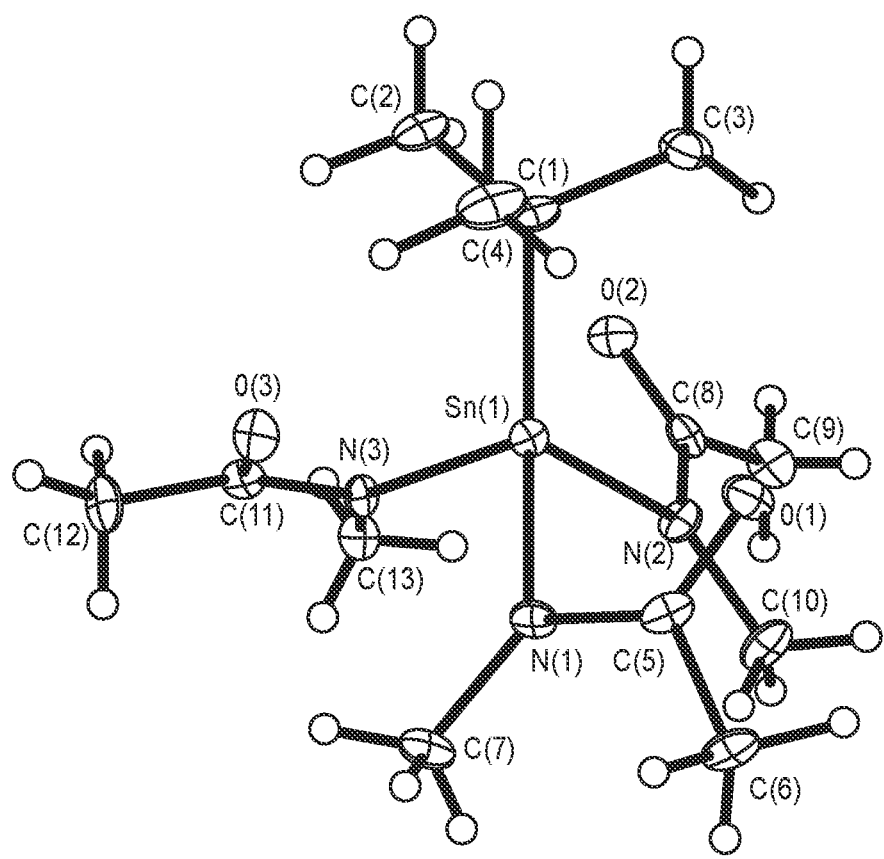
FIG. 11 is structure of t-butyltris(N-methylacetamido)tin (IV) obtained by X-ray structure determination of a crystalline product.
Figure 12:
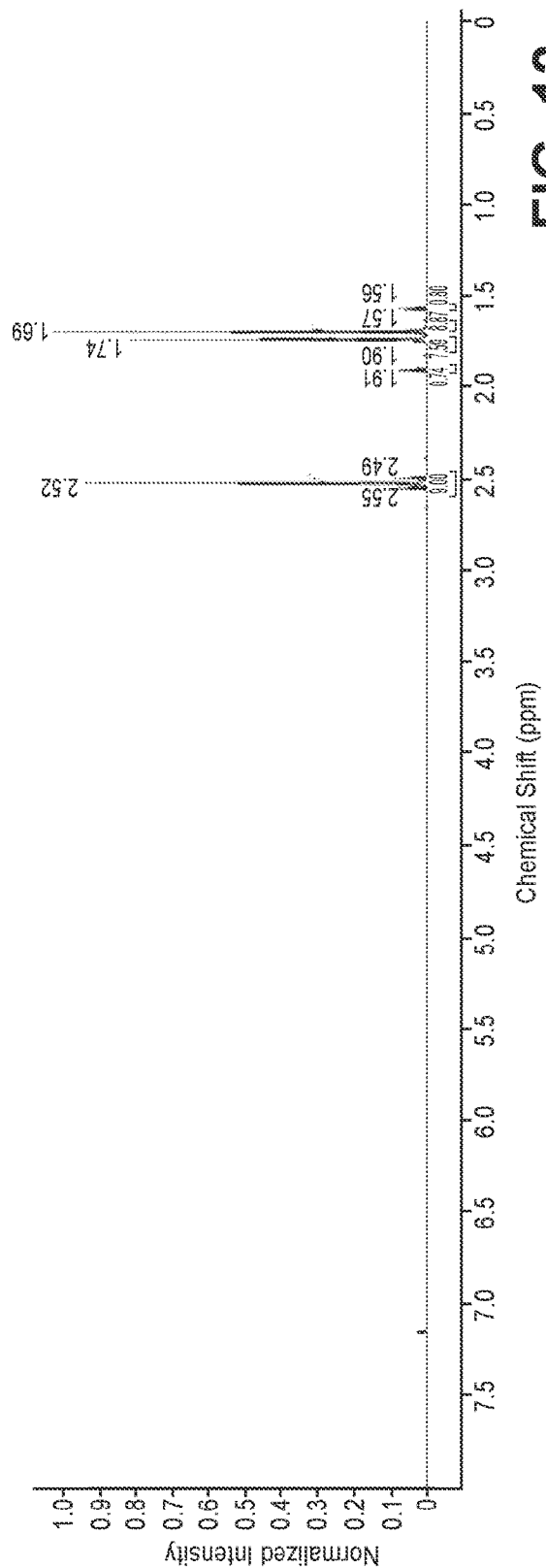
FIG. 12 is a $^1H$ NMR spectrum of t-butyltris(N-methylacetamido)tin(IV).
Figure 13:
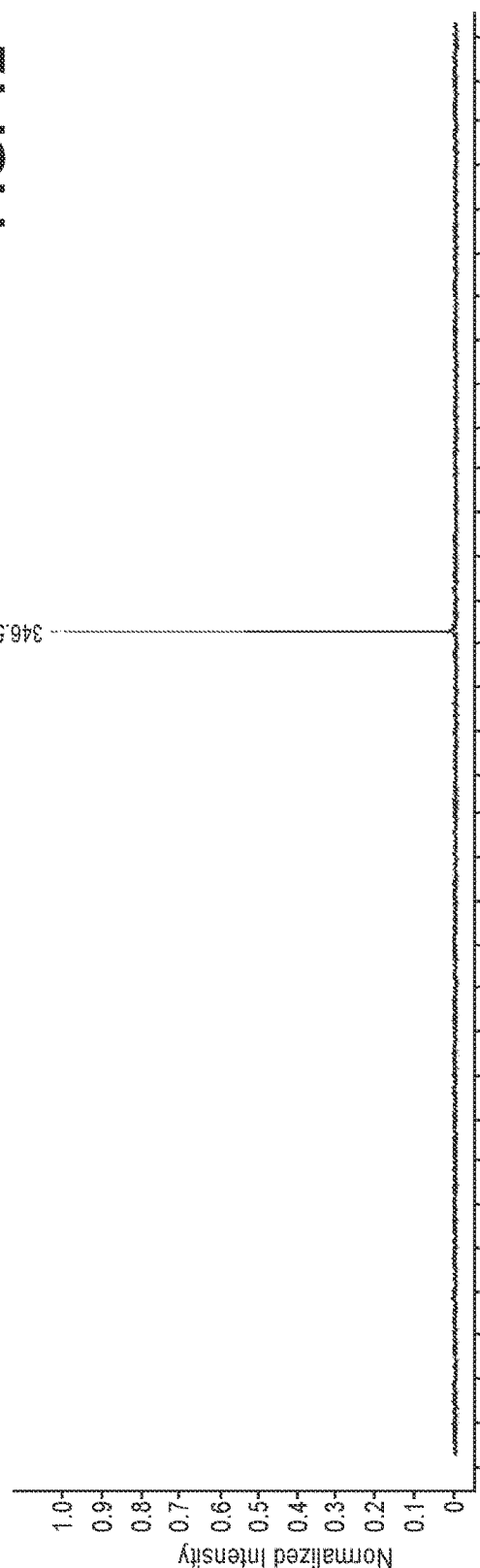
FIG. 13 is a $^{119}Sn$ NMR spectrum of t-butyltris(N-methylacetamido)tin(IV).

In a glovebox, a 250-mL Schlenk round bottom flask was charged with t-BuSn(NMe$_2$)$_3$ containing 1% t-Bu$_2$Sn(NMe$_2$)$_2$ (40.13 g, 130 mmol). t-BuSn(NMe$_2$)$_3$ was synthesized by Example 1 or Example 4. Fifty milliliters of toluene were added to the round bottom flask, which was followed by slow addition of N-methylacetamide (28.6 g, 391 mmol, Sigma) to control heat production. An additional 30 mL of toluene was used to wash all the N-methylacetamide into the reaction flask. The flask was sealed with a ground glass stopper and transferred to the Schlenk line. Over a period of several hours, large crystals precipitated from solution. The toluene was removed via cannula under an active argon purge. White crystals were harvested and rinsed twice with 100 mL pentane using cannula addition and subsequent removal. They were dried in vacuo yielding 40.6 g (80%) of t-butyltris(N-methylacetamido)tin(IV). FIG. 11 shows the crystal structure of the solid determined by X-ray diffraction. As shown in FIG. 12, the proton NMR spectrum produces the following peaks: $^1$H NMR (C$_6$D$_6$, 500 MHz): 2.52 (s, 9H, —NCH$_3$), 2.01 (m, 2H, —CyHpH), 1.74 (s, 9H, —(H$_3$C)$_3$CSn), 1.69 (s, 9H, —CH$_3$CO). As shown in FIG. 13, a tin NMR spectrum results in the following peaks: $^{119}$Sn NMR (C$_6$D$_6$, 186.4 MHz): −346.5.

Example 7. Synthesis of t-BuSn(Ot-Am)$_3$

This example demonstrates the synthesis of t-BuSn(Ot-Am)$_3$ from the t-butyltris(N-methylacetamido)tin(IV) product of Example 6.

In a glovebox with argon atmosphere, a 3-L round bottom flask was charged with t-butyltris(N-methylacetamido)tin(IV) (100 g, 255 mmol) from Example 6 followed by addition of NaOtAm (98 g, 890 mmol, Sigma). The mixture was slurried in 1.5 L of pentane using a magnetic stirrer and 2.5-inch long egg-shaped stir bar. The slurry thickened and turned a milky-white color after 30-60 minutes. Stirring was continued for approximately 16 h. The slurry was then filtered through a medium porosity fritted funnel in the glovebox, and the recovered solids were washed twice with 100 mL of pentane. The retained solids formed a very fine cake during filtration, so stirring was occasionally used to facilitate collection.

Figure 14:
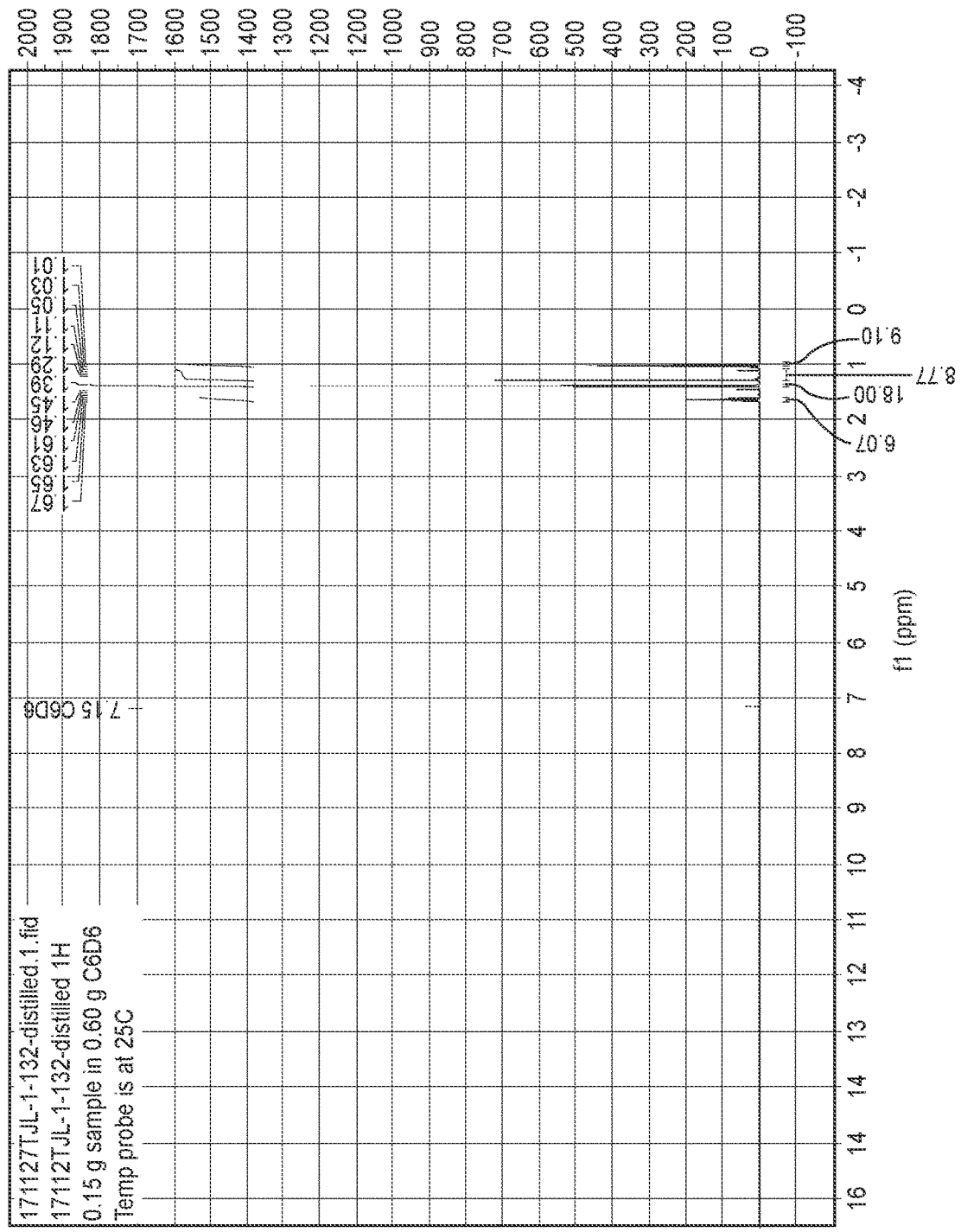
FIG. 14 is a $^1H$ NMR spectrum of t-BuSn(Ot-Am)$_3$ synthesized from t-butyltris(N-methylacetamido)tin(IV).
Figure 15:
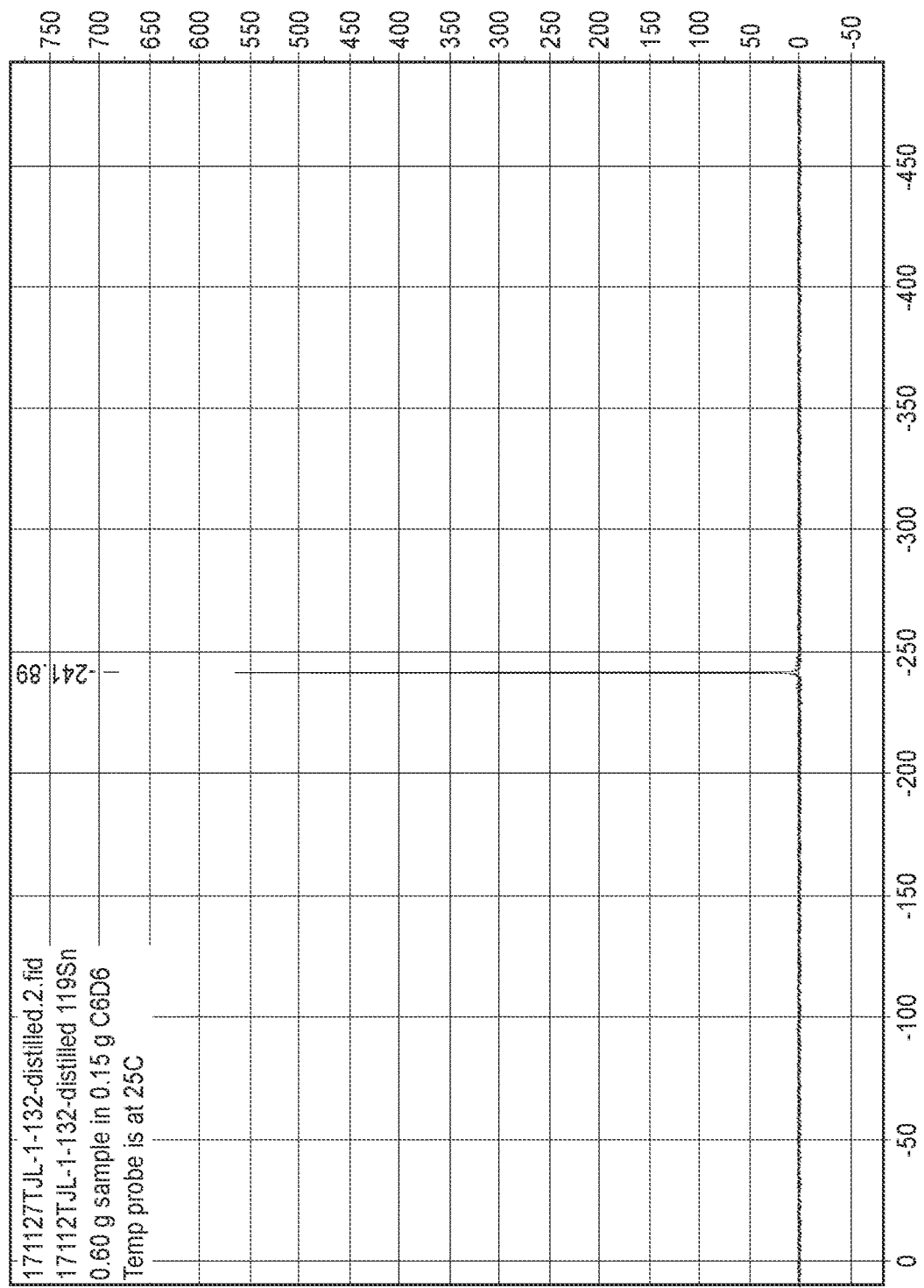
FIG. 15 is a $^{119}Sn$ NMR spectrum of t-BuSn(Ot-Am)$_3$ synthesized from t-butyltris(N-methylacetamido)tin(IV).
Figure 16:
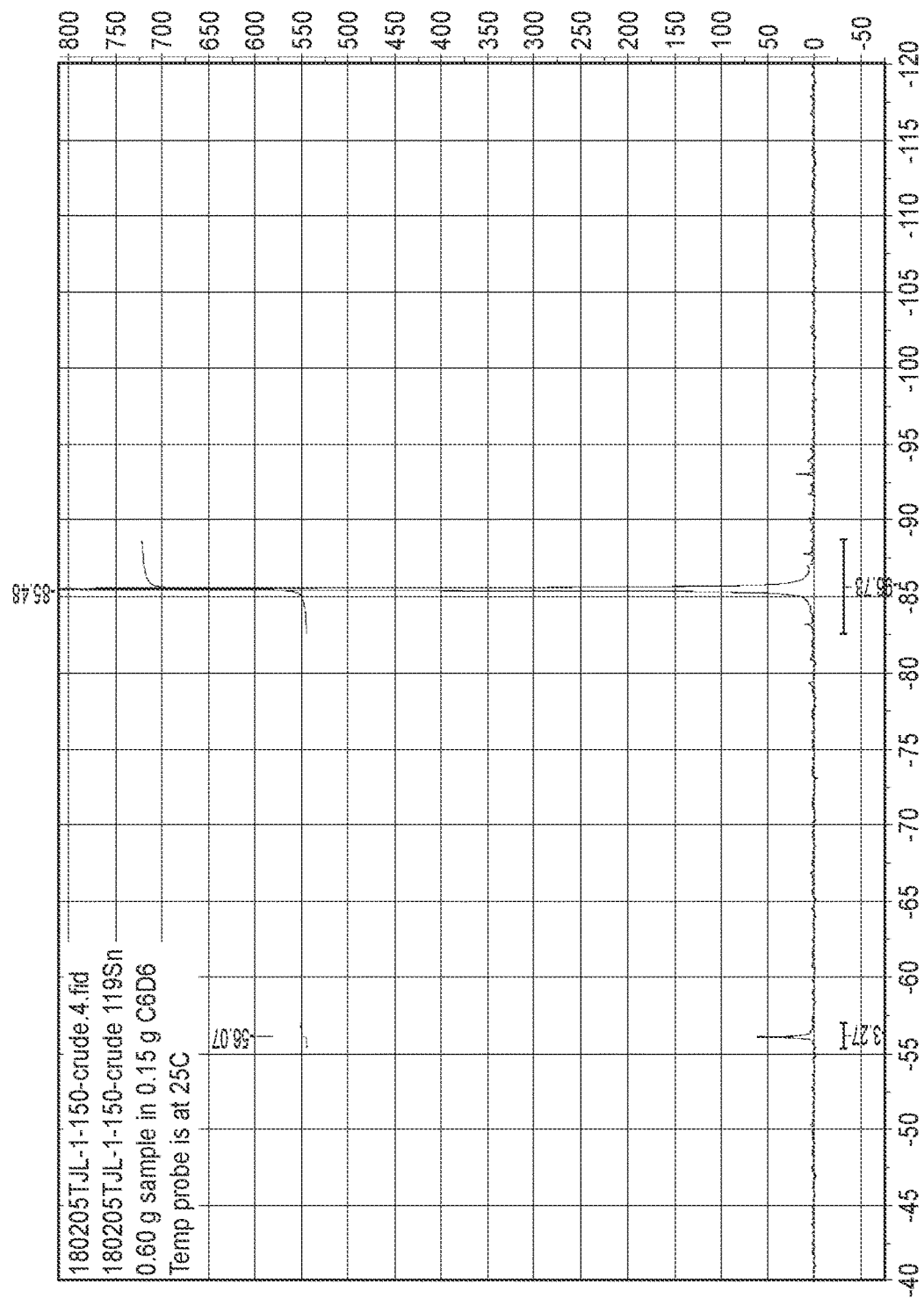
FIG. 16 is a $^{119}Sn$ NMR spectrum of t-BuSn(NMe$_2$)$_3$ spiked with t-Bu$_2$Sn(NMe$_2$)$_2$. The signal at 85.48 ppm corresponds to t-BuSn(NMe$_2$)$_3$, the signal at 56.07 ppm corresponds to (t-Bu)$_2$Sn(NMe$_2$)$_2$.

The filtrate was transferred to a two-neck 2-L flask equipped with a stir bar, and the flask was then sealed with a ground-glass stopper and Schlenk-inlet adapter. The flask was removed from the glovebox and connected to a vacuum line in a fume hood where excess solvent was stripped under vacuum. The crude product was then purified by vacuum distillation and collected in a 100-mL Schlenk storage flask. For the vacuum distillation, the oil bath was set to 150° C. The product was distilled at 300 mTorr and a temperature of 98-102° C. to yield 74 g (66%) of product. As shown in FIG. 14, a proton NMR spectrum displayed the following shifts: $^1$H NMR shifts [400 MHz, C$_6$D$_6$]: 1.64 (q, 6H, —CH$_2$), 1.39 (s, 18H, —C(CH$_3$)$_2$), 1.29 (s, 9H, (CH$_3$)$_3$CSn), 1.03 (t, 9H, —CCH$_3$). As shown in FIG. 15, the $^{119}$Sn NMR spectrum displayed the following peaks: $^{119}$Sn NMR shifts [149.18 MHz, C$_6$D$_6$]: −241.9. Quantitative NMR was performed to evaluate the purity following evaluation of a standard. $^1$H qNMR, standard 1,3,5-trimethoxybenzene, purity 97.3(1) mole % monoalkyl.

| Impurity | $I_{impurity}/I_{t\text{-}BuSn(OtAm)3}$ | % impurity/tBuSn(OtAm)$_3$ (mol mol$^{-1}$) |
|---|---|---|
| $^{119}$Sn qNMR on trace impurities: | | |
| tBu$_2$Sn(OtAm)$_2$ | 2 × 10$^{-3}$ | 0.1(2) |
| Sn(OtAm)$_4$ | (not detected) | 0.0(3) |

Example 8. Fractional Distillation Purification

This example demonstrates the effectiveness of fractional distillation to purify t-BuSn(NMe$_2$)$_3$ by its separation from a mixture of t-Bu$_2$Sn(NMe$_2$)$_2$ and t-BuSn(NMe$_2$)$_3$.

Figure 17:
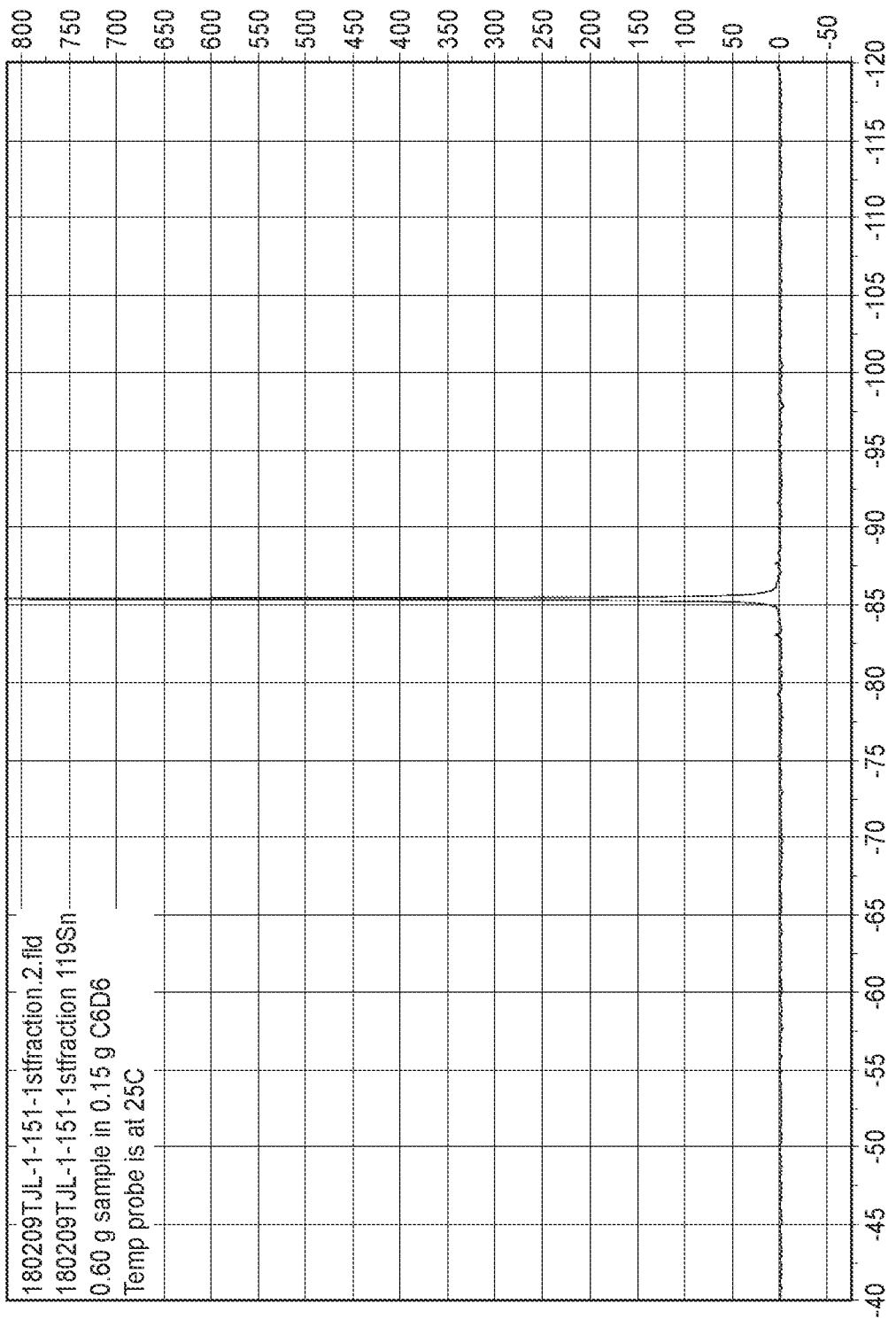
FIG. 17 is a $^{119}Sn$ NMR spectrum of t-BuSn(NMe$_2$)$_3$ from the first fraction collected by fractional distillation of the sample of FIG. 16.
Figure 18:
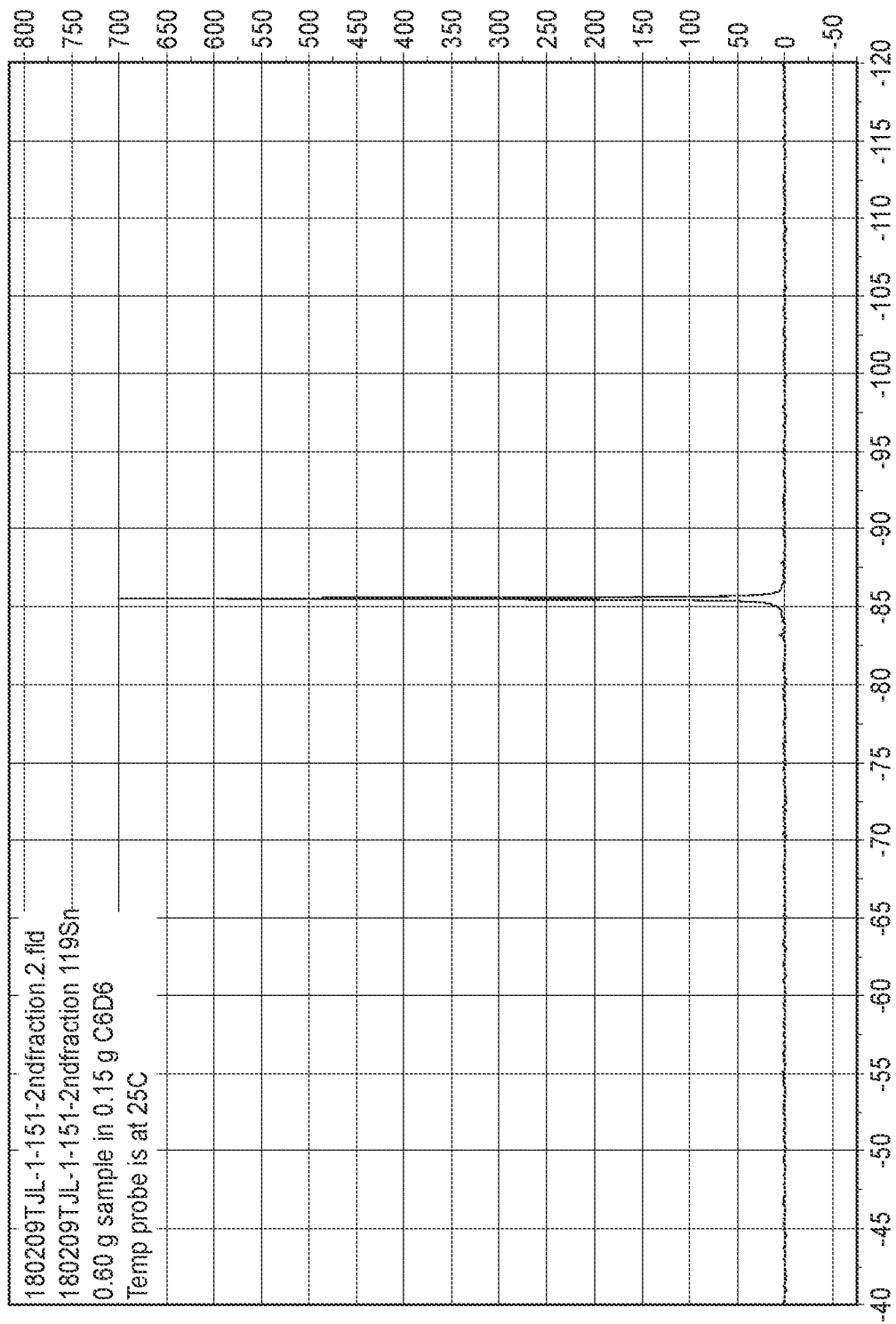
FIG. 18 is a $^{119}Sn$ NMR spectrum of t-BuSn(NMe$_2$)$_3$ from the second fraction collected by fractional distillation of the sample of FIG. 16.
Figure 19:
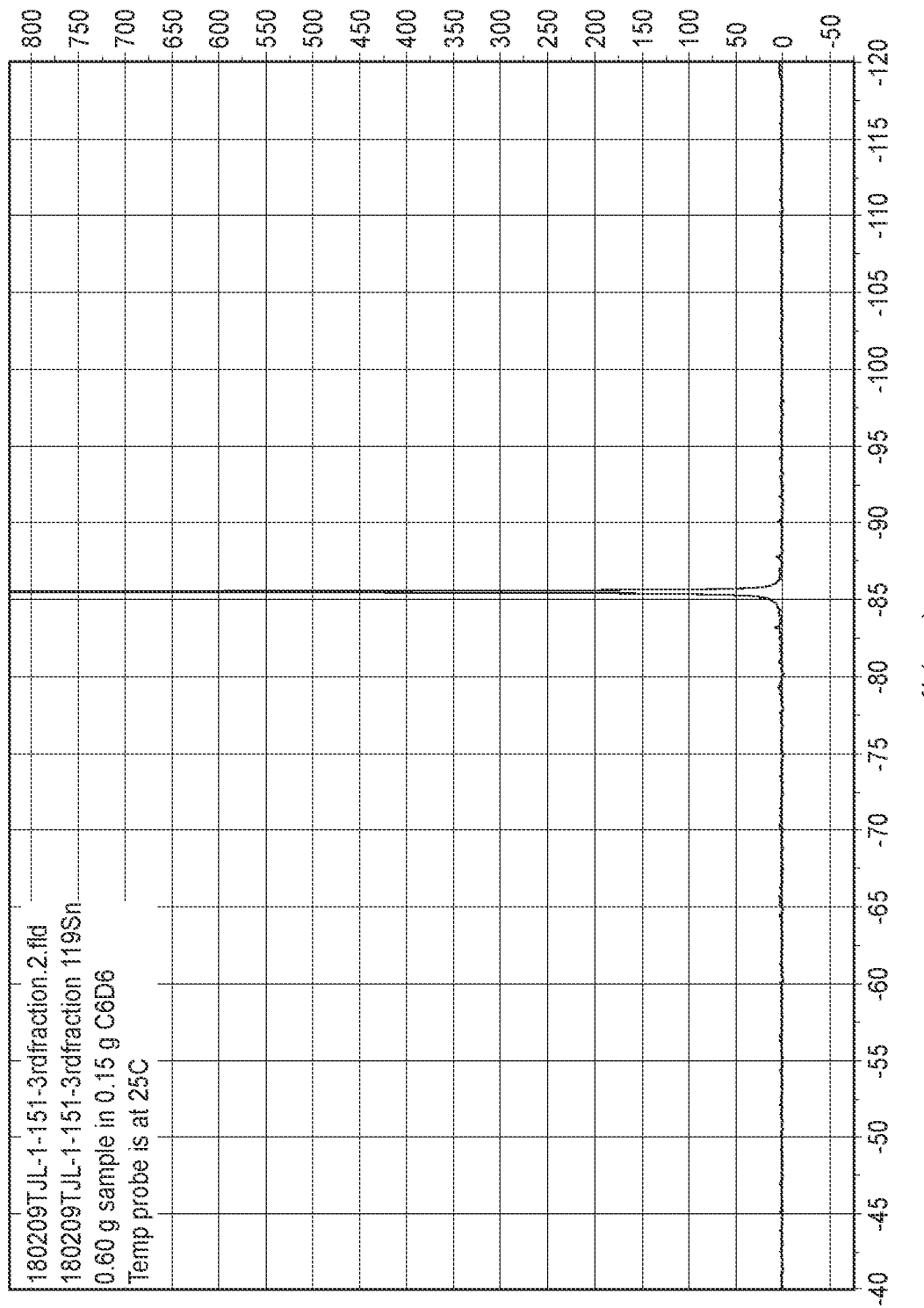
FIG. 19 is a $^{119}Sn$ NMR spectrum of t-BuSn(NMe$_2$)$_3$ from the third fraction collected by fractional distillation of the sample of FIG. 16.

In a glovebox, a 3000-mL 3-Neck round bottom flask (RBF) was charged with t-BuSn(NMe$_2$)$_3$ containing 3.27% t-Bu$_2$Sn(NMe$_2$)$_2$ (total 1420 g, 4.6 mols); the sample was prepared by the method described in Example 1 with a modified t-BuMgC:Sn(NMe$_2$)$_4$ ratio. Glass stoppers were placed in two necks of the RBF, and the third was attached to a Schlenk line. Separately, a 5-L Chemglass jacketed reactor was fitted with an overhead stirrer, temperature probe, and two 18-inch distillation columns stacked one atop the other. The distillation columns were filled with Pro-Pak™ (ThermoScientific, 0.24 in$^2$) high efficiency distillation column packing. A shortpath distillation head with temperature probe was attached to the top of the distillation columns. The top of the shortpath head was then connected to a 3-arm cow joint holding three 500-mL Schlenk bombs. The reactor was evacuated and back filled with argon three times. The t-Bu$_2$-rich mixture was added to the reactor via large cannula under argon. The jacketed reactor was heated between 110 and 120° C. at reduced pressure (500 mTorr) to initiate distillation. The temperature at the bottom of the distillation column was measured to be 95-100° C., while the temperature at the top of the column was maintained between 58 and 60° C. Three fractions were collected, and each was analyzed via $^{119}$Sn NMR spectroscopy. FIGS. 16-19 are plots of the $^{119}$Sn NMR spectra for the pooled sample (FIG. 16) and each of the three fractions (FIGS. 17-19 in order). All three fractions showed no NMR signals for t-Bu$_2$Sn(NMe$_2$)$_2$. Total yield, combining all fractions was 850 g (60%). $^{119}$Sn NMR (C$_6$D$_6$, 186.4 MHz): −85.45

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understood that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A high purity liquid composition comprising a mixture of a compound represented by the formula (CH$_2$)$_5$CHSn(N(CH$_3$)$_2$)$_3$ and no more than 4 mole % dialkyltin compounds as an impurity relative to the total tin amount.

2. The composition according to claim 1 further comprising one or more alkyl-tin compounds with a different alkyl ligand relative to the cyclohexyl compound and no more than 4 mole % dialkyltin compounds as an impurity relative to the total tin amount.

3. The composition of claim 2 wherein the different alkyl ligand is methyl, ethyl, tert-butyl, tert-amyl, or a combination thereof.

4. A solution comprising an organic solvent and the high purity liquid composition according to claim 1.

5. The solution of claim 4 having a concentration of the compound represented by the formula (CH$_2$)$_5$CHSn(N(CH$_3$)$_2$)$_3$ of from about 0.01M to about 2M.

6. The solution of claim 4 wherein the organic solvent comprises an alkane, an aromatic hydrocarbon, an ether, an alcohol, or a mixture thereof.

7. The solution of claim 4 further comprising RSnO$_{(3/2-x/2)}$(OH)$_x$ (0<x<3), where R is an alkyl, cycloalkyl, branched alkyl, or substituted alkyl moiety having from 1 to 31 carbon atoms.

8. A method to selectively form a monoalkyltin trialkoxide compound with low dialkyl tin contamination, the method comprising,
reacting a (CH$_2$)$_5$CHSn(N(CH$_3$)$_2$)$_3$ compound with an alcohol represented by the formula HOR" in an organic solvent to form (CH$_2$)$_5$CHSn(OR")$_3$, wherein the (CH$_2$)$_5$CHSn(N(CH$_3$)$_2$)$_3$ reagent comprises the high purity liquid composition according to claim 1, wherein R" is a hydrocarbyl group with 1-10 carbon atoms.

9. The method of claim 8 wherein the reaction is performed with a tetradentate chelating agent in an amount from about 0.5 mole % to about 15 mole % relative to the tin molar quantity.

10. A solution comprising an organic solvent and the (CH$_2$)$_5$CHSn(OR")$_3$ prepared according to the method of claim 8.

11. The solution of claim 10 having a concentration of from about 0.01M to about 2M and wherein the solvent comprises an alcohol.

* * * * *